US009122064B2

(12) United States Patent
Sato et al.

(10) Patent No.: US 9,122,064 B2
(45) Date of Patent: Sep. 1, 2015

(54) DISPLAY DEVICE, TERMINAL DEVICE, AND DISPLAY METHOD

(75) Inventors: Tetsusi Sato, Kanagawa (JP); Koji Shigemura, Kanagawa (JP); Masahiro Serizawa, Tokyo (JP)

(73) Assignees: NEC CORPORATION, Tokyo (JP); NLT TECHNOLOGIES, LTD., Kanagawa (JP)

( * ) Notice: Subject to any disclaimer, the term of this patent is extended or adjusted under 35 U.S.C. 154(b) by 321 days.

(21) Appl. No.: 13/129,753

(22) PCT Filed: Oct. 7, 2009

(86) PCT No.: PCT/JP2009/067469
§ 371 (c)(1),
(2), (4) Date: May 17, 2011

(87) PCT Pub. No.: WO2010/061689
PCT Pub. Date: Jun. 3, 2010

(65) Prior Publication Data
US 2011/0221750 A1    Sep. 15, 2011

(30) Foreign Application Priority Data

Nov. 26, 2008   (JP) .................... 2008-300965

(51) Int. Cl.
*G06T 15/00*   (2011.01)
*H04N 13/04*   (2006.01)
*G02B 27/22*   (2006.01)

(52) U.S. Cl.
CPC ........ *G02B 27/2214* (2013.01); *H04N 13/0413* (2013.01); *H04N 13/0454* (2013.01)

(58) Field of Classification Search
CPC ........... G02B 27/2214; H04N 13/0413; H04N 13/0454
See application file for complete search history.

(56) References Cited

U.S. PATENT DOCUMENTS

| 5,966,167 A  * | 10/1999 | Nose et al. ................ 348/59 |
| 2005/0285997 A1* | 12/2005 | Koyama et al. ............ 349/117 |
| 2006/0192776 A1* | 8/2006 | Nomura et al. ............ 345/419 |
| 2008/0007511 A1* | 1/2008 | Tsuboi et al. .............. 345/102 |
| 2008/0211976 A1* | 9/2008 | Nam et al. ................. 349/15 |

FOREIGN PATENT DOCUMENTS

| JP | 9-152668 A | 6/1997 |
| JP | 10-142556 A | 5/1998 |
| JP | 11-72697 A | 3/1999 |
| JP | 11234703 A | 8/1999 |
| JP | 11-355808 A | 12/1999 |
| JP | 2000152285 A | 5/2000 |
| JP | 2001066547 A | 3/2001 |
| JP | 2004294861 A | 10/2004 |

(Continued)

OTHER PUBLICATIONS

International Search Report for PCT/JP2009/067469 mailed Nov. 2, 2009.

(Continued)

*Primary Examiner* — Dave Czekaj
*Assistant Examiner* — Md Haque
(74) *Attorney, Agent, or Firm* — Sughrue Mion, PLLC

(57) ABSTRACT

Movement of a display device is detected, and an image is displayed in stereoscopic display or planar display depending on the detected movement.

33 Claims, 45 Drawing Sheets

(56) References Cited

FOREIGN PATENT DOCUMENTS

| JP | 2004356997 A | | 12/2004 |
|---|---|---|---|
| JP | 2005006114 A | | 1/2005 |
| JP | 2005151080 A | | 6/2005 |
| JP | 2005167310 A | | 6/2005 |
| JP | 2005-266293 | * | 9/2005 |
| JP | 2005266293 A | | 9/2005 |
| JP | 2006023599 A | | 1/2006 |
| JP | 200647507 A | | 2/2006 |
| JP | 2007019666 A | | 1/2007 |
| JP | 2007047294 A | | 2/2007 |
| JP | 2007121489 A | | 5/2007 |
| JP | 2007318184 A | | 12/2007 |

OTHER PUBLICATIONS

"Kido wo Otosazu Sanjigen-hyoji Kamaboko-jyo Renzu wo Jyoge", Nikkei Electronics, No. 838, Jan. 6, 2003 pp. 26-27.
Office Action dated Oct. 22, 2013, issued by the Japan Patent Office in corresponding Japanese Application No. 2012-278159.

* cited by examiner

LEFT-EYE IMAGE    RIGHT-EYE IMAGE

IMAGE DATA WITH PARALLAX (3D DATA)

IMAGE DATA FREE OF PARALLAX (2D DATA)

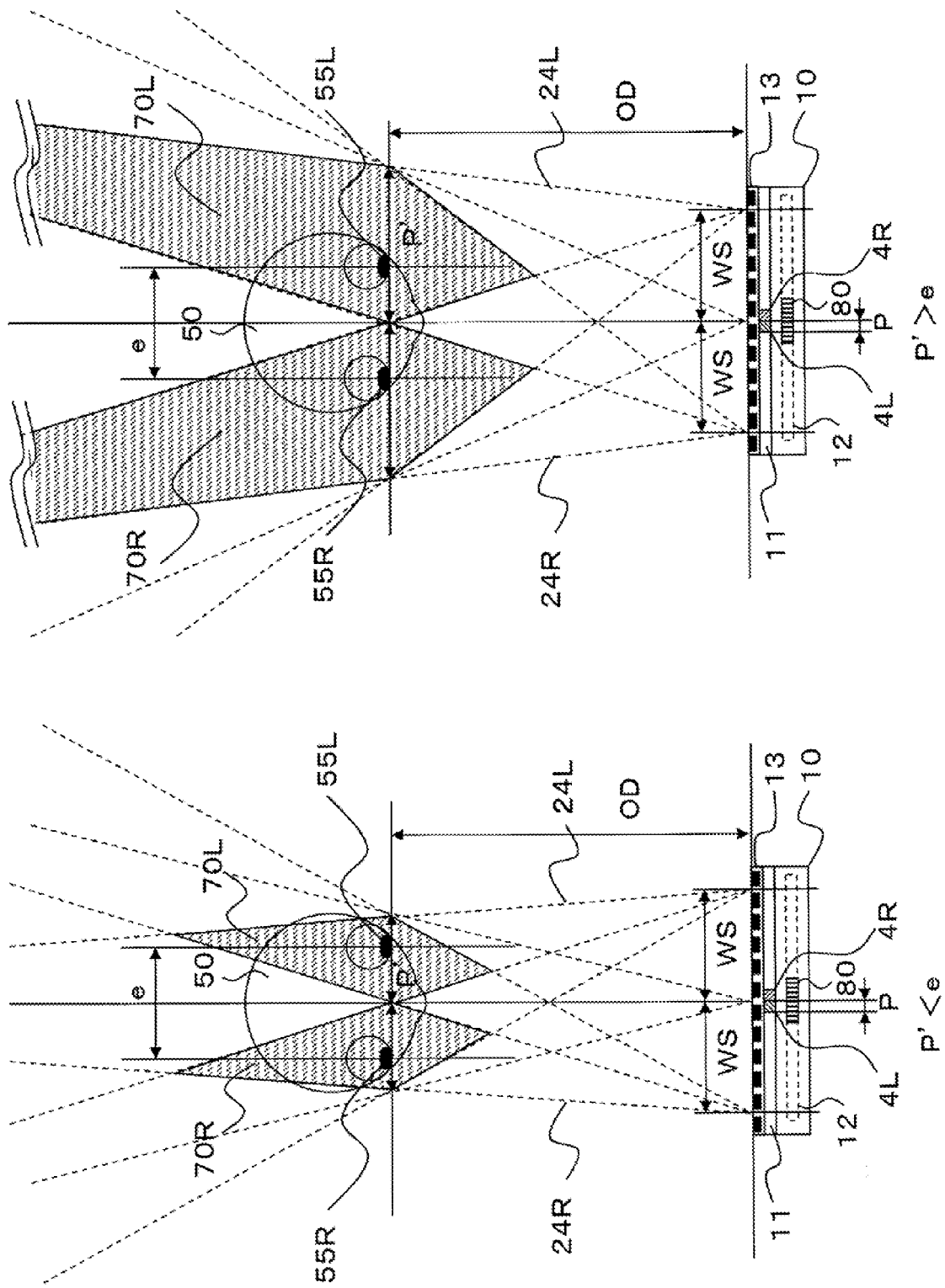

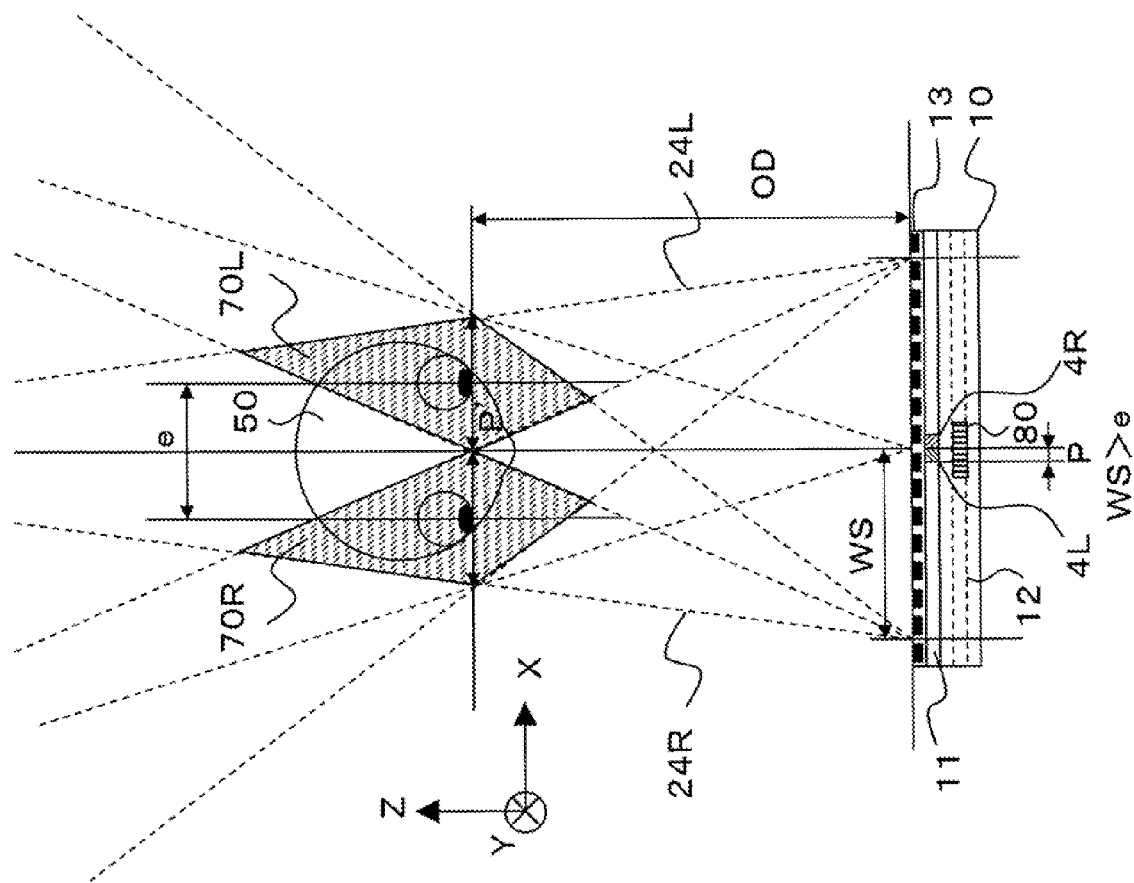

LEFT-EYE IMAGE   RIGHT-EYE IMAGE

IMAGE DATA WITH PARALLAX (3D DATA)

LEFT-EYE IMAGE    RIGHT-EYE IMAGE

IMAGE DATA FREE OF PARALLAX (2D DATA)

standard display panel display panel according to the fourth exemplary embodiment

LEFT-EYE IMAGE    RIGHT-EYE IMAGE

IMAGE DATA WITH PARALLAX (3D DATA)

LEFT-EYE IMAGE    RIGHT-EYE IMAGE

IMAGE DATA FREE OF PARALLAX (2D DATA)
RIGHT-EYE DATA FOR BOTH IMAGES

LEFT-EYE IMAGE    RIGHT-EYE IMAGE

IMAGE DATA FREE OF PARALLAX (2D DATA)
LEFT-EYE DATA FOR BOTH IMAGES

LEFT-EYE IMAGE    RIGHT-EYE IMAGE

IMAGE DATA FREE OF PARALLAX (2D DATA)
CENTRAL IMAGE FOR BOTH IMAGES

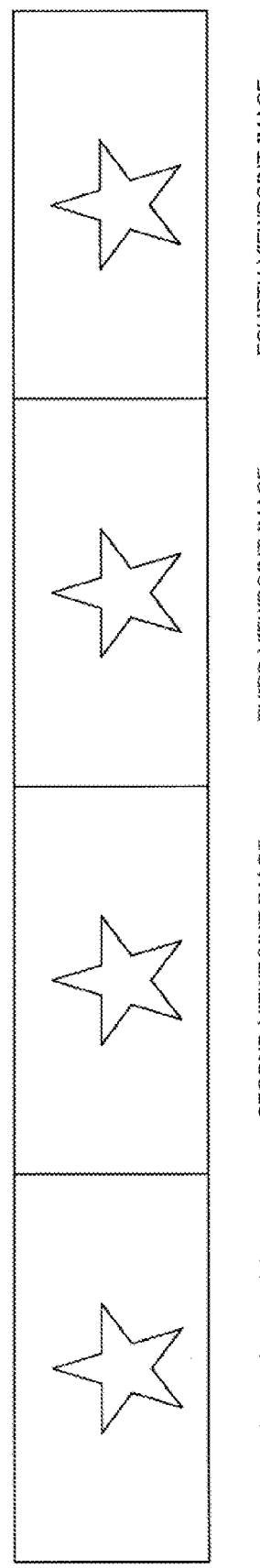

DISPLAY DEVICE, TERMINAL DEVICE, AND DISPLAY METHOD

TECHNICAL FIELD

The present invention relates to a display device and a display method for displaying images, and more particularly to a display device, a terminal device, and a display method for displaying stereoscopic images.

BACKGROUND ART

With the developments of mobile phones and PDAs (Personal Digital Assistants) in recent years, efforts have been made in the art to produce smaller-size and higher-definition display devices. Attention has been drawn to stereoscopic display devices as a new extra value that can be added to mobile devices. Generally, a means for displaying stereoscopic images relies on a process of projecting images having a binocular disparity respectively to the left and right eyes. There is a stereoscopic display device including a display panel which has a lenticular lens or a parallax barrier as an image swapping means. Another stereoscopic display device is of the time division type which includes two light sources for applying light to the right and left eyes to project left and right parallax images to the right and left eyes (see, for example, Patent document 1).

The stereoscopic display devices of the above types are suitable for use on mobile devices in that they do not require the observer to wear special glasses and hence to take the trouble of wearing glasses. Actually, mobile phones incorporating parallax-barrier stereoscopic display devices are available as commercial products (see, for example, Non-patent document 1).

According to the above principles, however, since spatially separate parallax images are projected, the observer can see proper stereoscopic images in a limited area. The area in which the observer can see stereoscopic images is called a stereoscopic viewing area, and is determined when the stereoscopic display device is designed. If the positions of the eyes of the observer are shifted out of the stereoscopic viewing area, then problems arise in that the left image and the right image may look overlapping (so-called dual image) and an image with a reversed protrusion depth (so-called pseudo-stereoscopic image) may be observed.

The stereoscopic viewing area will be described below.

First, a stereoscopic viewing area achieved when a parallax barrier is used as an image swapping means will be described below.

FIG. 1 shows by way of example an optical model wherein parallax images are projected onto the left and right eyes of the observer in a parallax-barrier stereoscopic display device. FIG. 1 is a cross-sectional view as seen from above the head of the observer, showing a positional relationship in which both eyes (right eye 55R and left eye 55L) of the observer are positioned on observational plane 30 which is spaced from the display surface of the display device by optimum observation distance OD and the center between the eyes of the observer is aligned with the center of the display panel.

The display panel (not shown) comprises a group of light modulating elements as a matrix of pixels (e.g., a liquid crystal panel). FIG. 1 shows only pixels at both ends and the center of the display panel among right-eye pixels 4R and left-eye pixels 4L which are alternately arrayed. Parallax barrier 6 which functions as an image swapping means is disposed behind the display panel as viewed from the observer. Parallax barrier 6 is a barrier (light shield plate) with a number of narrow stripe-shaped vertical slits 6a, and is arranged such that its longitudinal direction is perpendicular to the direction along which left-eye pixels 4L and right-eye pixels 4R of the display panel are arrayed. A light source (not shown: so-called backlight) is disposed further behind the parallax barrier. Light emitted from the light source travels through slits 6a, has its intensity modulated by the pixels of the display panel, and is then projected toward the observer. The directions of light projected from right-eye pixels 4R and left-eye pixels 4L are limited by the presence of slits 6a. The paths of light rays which are emitted from slits 6a and which travel through the closest pixels are shown as light rays 20. These light rays 20 define right-eye area 70R where images projected from all right-eye pixels 4R are superposed and left-eye area 70L where images projected from all left-eye pixels 4L are superposed. In right-eye area 70R, the observer can observe only the images projected from all right-eye pixels 4R. In left-eye area 70L, the observer can observe only the images projected from all left-eye pixels 4L. Therefore, when right eye 55R of the observer is positioned in right-eye area 70R and left eye 55L of the observer is positioned in left-eye area 70L, the observer visually recognizes parallax images projected onto the right and left eyes thereof as a stereoscopic image. Stated otherwise, when right eye 55R of the observer is positioned in right-eye area 70R and when left eye 55L of the observer is positioned in left-eye area 70L, the observer can observe a desired stereoscopic image.

The display device shown in FIG. 1 is designed such that all images (width P') projected from right-eye pixels 4R and left-eye pixels 4L (width P) at the distance OD are superposed in order to maximize width L of right-eye area 70R and left-eye area 70L. Width P' of the projected images is determined mainly from distance h between slits 6a and the pixels, pixel pitch P, and optimum observation distance OD. If P' is increased, then the width of right-eye area 70R and left-eye area 70L is also increased, but the stereoscopic viewing area in which the observer can visually recognize stereoscopic images may not necessarily be increased because it is impossible to place the eyes of the observer in any desired positions. If it is assumed that the distance between the eyes is represented by e, then the display device should preferably be designed such that P' is equal to inter-eye distance e. If P' is smaller than inter-eye distance e, then the stereoscopic viewing area is limited to P'. If P' is greater than inter-eye distance e, then it is only that an area in which both eyes are positioned in right-eye area 70R or left-eye area 70L is increased. Minimum distance ND and maximum distance FD up to the display panel, at which the observer can see stereoscopic images, are also determined by inter-eye distance e, right-eye area 70R, and left-eye area 70L.

As described above, the area in which the observer sees stereoscopic images based on projected parallax images is determined by not only right-eye area 70R and left-eye area 70L which are optically determined by the image swapping means, but also the inter-eye distance e of the observer. Consequently, the stereoscopic viewing area may be expressed by an area around midpoint M between right eye 55R and left eye 55L of the observer.

As shown in FIG. 2, stereoscopic viewing area 71 thus defined is of a diamond-shaped rectangle. However, stereoscopic viewing area 71 shown in FIG. 2 is effective only when the plane including the eyes of the observer and the surface of the display panel lie parallel to each other.

FIG. 3 shows an optical model wherein parallax barrier 6 functioning as the image swapping means is positioned in front of the display panel as viewed from the observer. As is the case with the example in which parallax barrier 6 is positioned behind the display panel, the display device is designed such that the observer is in optimum observation position OD and the images (width P') projected from the left and right pixels (width P) are superposed. The paths of light rays which are emitted from the pixels and which travel through the closest slits 6a are shown as light rays 20. These light rays 20 define right-eye area 70R where images projected from all right-eye pixels 4R are superposed and left-eye area 70L where images projected from all left-eye pixels 4L are superposed.

FIG. 4 shows a stereoscopic viewing area created by using a lenticular lens as an image swapping means.

FIG. 4 is similar to FIG. 3 except that the image swapping means is different.

An optical model using a lenticular lens with the observer shifted out of the stereoscopic viewing area will be described below.

FIG. 5 is a cross-sectional view as seen from above the head of the observer, showing the observer shifted to the right out of stereoscopic viewing area 71 which is expressed using midpoint M between right eye 55R and left eye 55L. Right eye 55R of the observer is positioned outside of right-eye area 70R, and left eye 55L is positioned within right-eye area 70R. At this time, light rays 20 which are emitted from left-eye pixels 4L and right-eye pixels 4R and which travel through the principal points (vertexes) of closest cylindrical lenses 3a do not reach the position of right eye 55R of the observer. Light rays 21 which are emitted from left-eye pixels 4L and which travel through the principal points (vertexes) of second closest cylindrical lenses 3a, define second left-eye area 72. In FIG. 5, the observer observes the image projected from left-eye pixels 4L with right eye 55R, and observes the image projected from right-eye pixels 4R with left eye 55L. Therefore, when the observer observes parallax images, the protrusion depth is reversed (so-called pseudo-stereoscopic image), and the observer fails to observe a desired stereoscopic image.

To solve the above problem, there has been proposed a process of detecting the position of the observer at all times and switching around the displayed images of right-eye pixels and left-eye pixels depending on the detected position (see, for example, Patent document 2).

There has also been proposed a process of capturing an image of an observer with a camera, detecting a viewpoint position from an obtained image of the face of the observer, and adjusting parallax images (see, for example, Patent document 3).

For detecting a viewpoint position, there has been proposed a process of detecting a pupil with an infrared irradiator and a camera (see, for example, Patent document 4).

PRIOR ART DOCUMENTS

Patent Documents

Patent document 1: JP 2001-66547A (pages 3-4, FIG. 6)
Patent document 2: JP 9-152668A
Patent document 3: JP 2000-152285A
Patent document 4: JP 11-72697A Non-Patent Documents Non-patent document 1: Nikkei Electronics, Jan. 6, 2003, No. 838, p. 26-27

SUMMARY OF THE INVENTION

Problems to be Solved by the Invention

While a portable stereoscopic display device allows the observer to adjust the display device to a position optimum for stereoscopic viewing using the observer's own body, the display device itself may be tilted or moved due to external factors such as operations on the display device and swinging movements of the vehicle on which the display device is used.

As a result of movement of the display device, the positions of the eyes of the observer may be shifted out of the stereoscopic viewing area. In such a case, the observer may not only feel uncomfortable from viewing dual images and pseudo-stereoscopic images, but also feel tired from repeatedly viewing normal stereoscopic images, dual images, and pseudo-stereoscopic images, tending to suffer symptoms such as vertigo and motion sickness.

According to a general viewpoint tracking system, the display device needs to incorporate a camera, an image processing function to detect viewpoint positions, and an infrared irradiator, and hence becomes large in size and has to meet requirements for sophisticated image processing capabilities. Therefore, the general viewpoint tracking system is not suitable for use on portable stereoscopic display devices.

It is an object of the present invention to provide a display device, a terminal device, and a display method which solve the above problems.

Means for Solving the Problems

According to the present invention, there is provided a display device for displaying an image, wherein movement of the display device is detected and said image is displayed in a stereoscopic display or planar display depending on the detected movement.

According to the present invention, there is also provided a display method for displaying an image on a display device, comprising:

detecting movement of the display device; and displaying the image in either a stereoscopic display or a planar display depending on the detected movement.

Advantages of the Invention

According to the present invention, as described above, movement of the display device is detected and an image is displayed in a stereoscopic display or planar display depending on the detected movement. Therefore, even if the display device is moved against the will of the observer, placing the observer out of a stereoscopic viewing area, the observer is easily prevented from observing a pseudo-stereoscopic image and a dual image and hence is prevented from feeling uncomfortable and tired.

BRIEF DESCRIPTION OF THE DRAWINGS

FIG. 11 is a diagram showing an optical model in which the width of images projected from pixels is not equal to the inter-eye distance of the observer in the display device according to the present invention;

FIG. 12(a) is a diagram showing an optical model in which the distance between a central slit and an end slit of an image swapping means is not equal to the inter-eye distance of the observer in the display device according to the present invention;

FIG. 32(b) is a diagram showing image data generated by the image generator according to the sixth and seventh exemplary embodiments of the present invention.

MODES FOR CARRYING OUT THE INVENTION

Exemplary embodiments of the present invention will be described in detail below with reference to the drawings.

(First Exemplary Embodiment)
[Description of the Structure]

Figure 6:
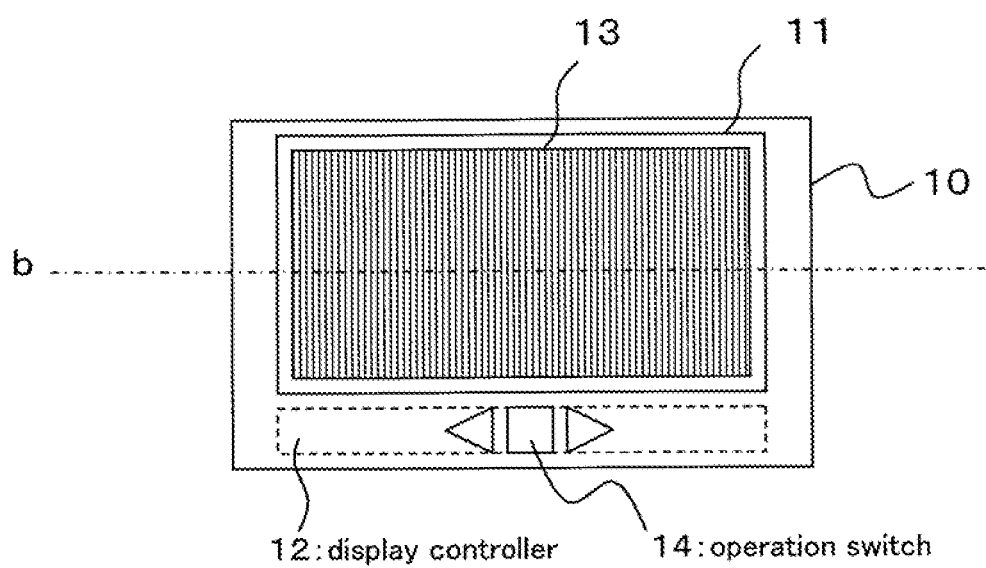
FIG. 6 is a front elevational view of a display device according to the present invention.

FIG. 6 is a front elevational view of a display device according to the present invention.

Figure 7:
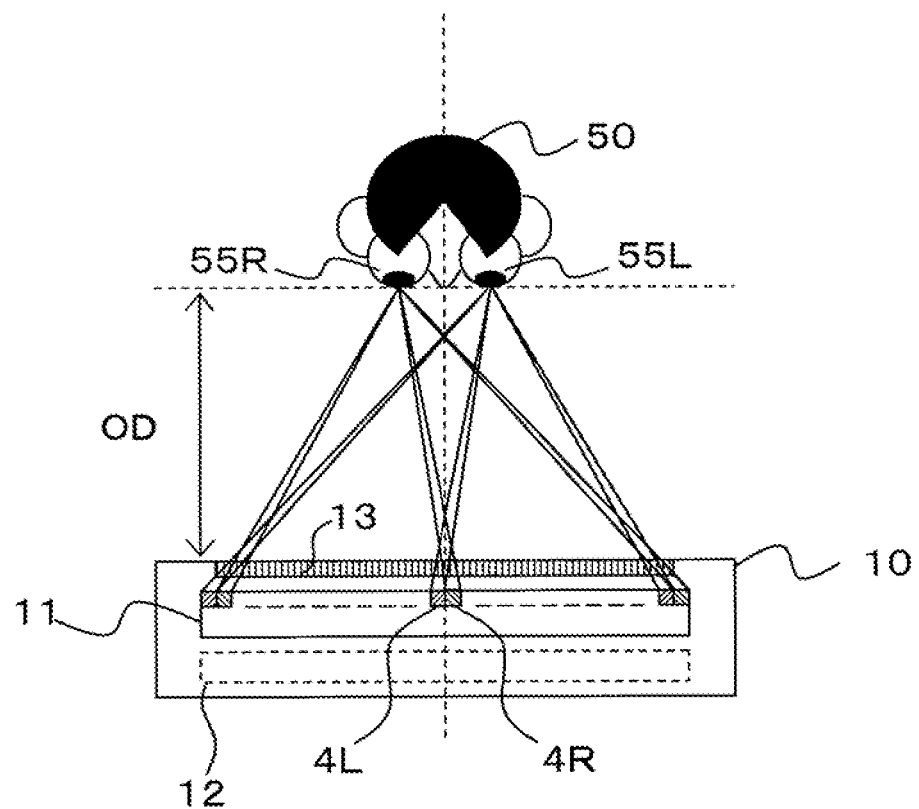
FIG. 7 is a cross-sectional view of the display device according to the present invention.

FIG. 7 is a cross-sectional view of the display device, taken along line b of FIG. 6 as seen from above the head of the observer.

The display device according to the present invention includes display panel 11, image swapping means 13, display controller 12, and operation switch 14 which are housed in casing 10.

Display panel 11 comprises a transmissive liquid crystal panel with a matrix of unit pixels. For displaying stereoscopic images, the unit pixels that are arrayed in a horizontal direction which is parallel to the direction along which both eyes of the observer are arrayed are alternately used as left-eye pixels 4L and right-eye pixels 4R. In FIG. 7, those left-eye pixels 4L and right-eye pixels 4R other than the pixels at the opposite ends and center of display panel 11 are omitted from illustration.

Image swapping means 13 is an electrooptical device for displaying a parallax barrier pattern, and may comprise a transmissive liquid crystal panel, for example. Image swapping means 13 is placed over display panel 11 so that when image swapping means 13 displays a parallax barrier pattern, transmissive regions acting as slits extend vertically with respect to display panel 11 and are positioned between right-eye pixels 4R and left-eye pixels 4L. The distance between image swapping means 13 and display panel 11 and the pitch of the slits should preferably be designed such that when an optimum observation distance is determined for the observer, images projected from all right-eye pixels 4R of display panel 11 are projected onto right eye 55R of observer 50 and images projected from all left-eye pixels 4L of display panel 11 are projected onto left eye 55L of observer 50. When image swapping means 13 does not display a parallax barrier pattern, it does not function as a barrier, and the images projected from both the right-eye pixels and left-eye pixels are projected onto both eyes of the observer, as is the case with the ordinary panel displays. Image swapping means 13 thus controls the projection of images displayed by display panel 11 outwardly from display panel 11.

Display controller 12 has a function to drive display panel 11, a function to control the barrier, and a function to detect movement of casing 10 for determining stereoscopic vision.

Display controller 12 will be described below with reference to FIG. 8.

Figure 8:
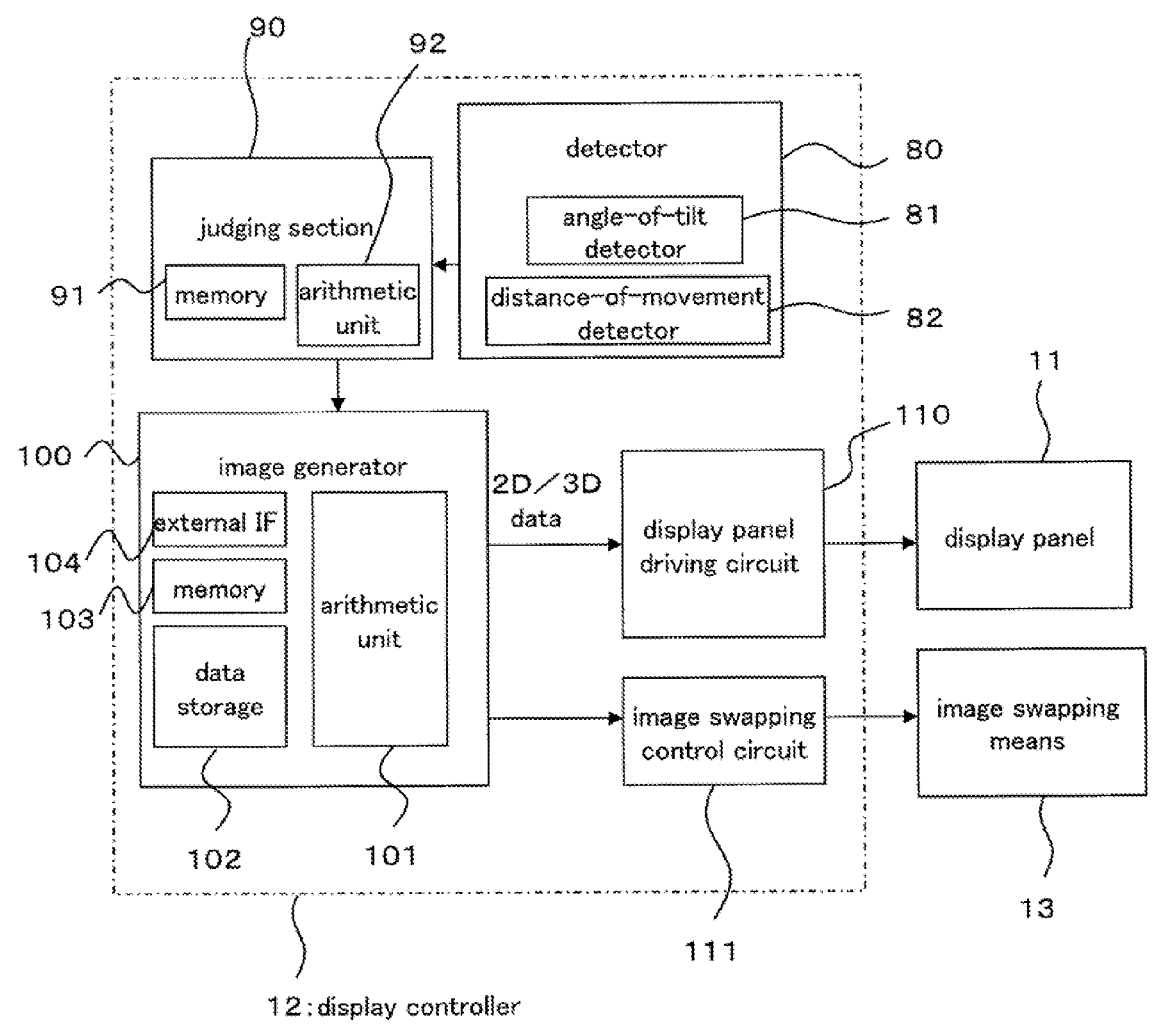
FIG. 8 is a functional block diagram of a display controller according to a first exemplary embodiment of the present invention.

FIG. 8 is a functional block diagram of display controller 12 according to a first exemplary embodiment of the present invention.

Display controller 12 comprises image generator 100, detector 80, judging section 90, display panel driving circuit 110, and image swapping control circuit 111.

Detector 80 comprises a sensor for detecting a displacement caused when casing 10 is moved. The displacement of casing 10 represents a change in an angle of tilt or a movement. If detector 80 comprises a sensor such as an acceleration sensor, a geomagnetic sensor, or the like, then detector 80 can calculate a displacement with respect to the gravitational acceleration or geomagnetism.

Judging section 90 includes memory 91 for storing information about an angle of tilt or a movement produced by the sensor of detector 80 and information about a stereoscopic viewing area of display panel II, and arithmetic unit 92 for determining whether or not both eyes of the observer are in the stereoscopic viewing area from the information obtained from the sensor of detector 80 and the information stored in memory 91.

Image generator 100 has a function to generate image data to be sent to display panel 11, and comprises arithmetic unit 101, data storage 102, memory 103, and external IF (InterFace) 104. Image generator 100 also has a function to generate image data (3D data) with a parallax or image data (2D data) without a parallax depending on a signal from judging section 90.

Figure 1:
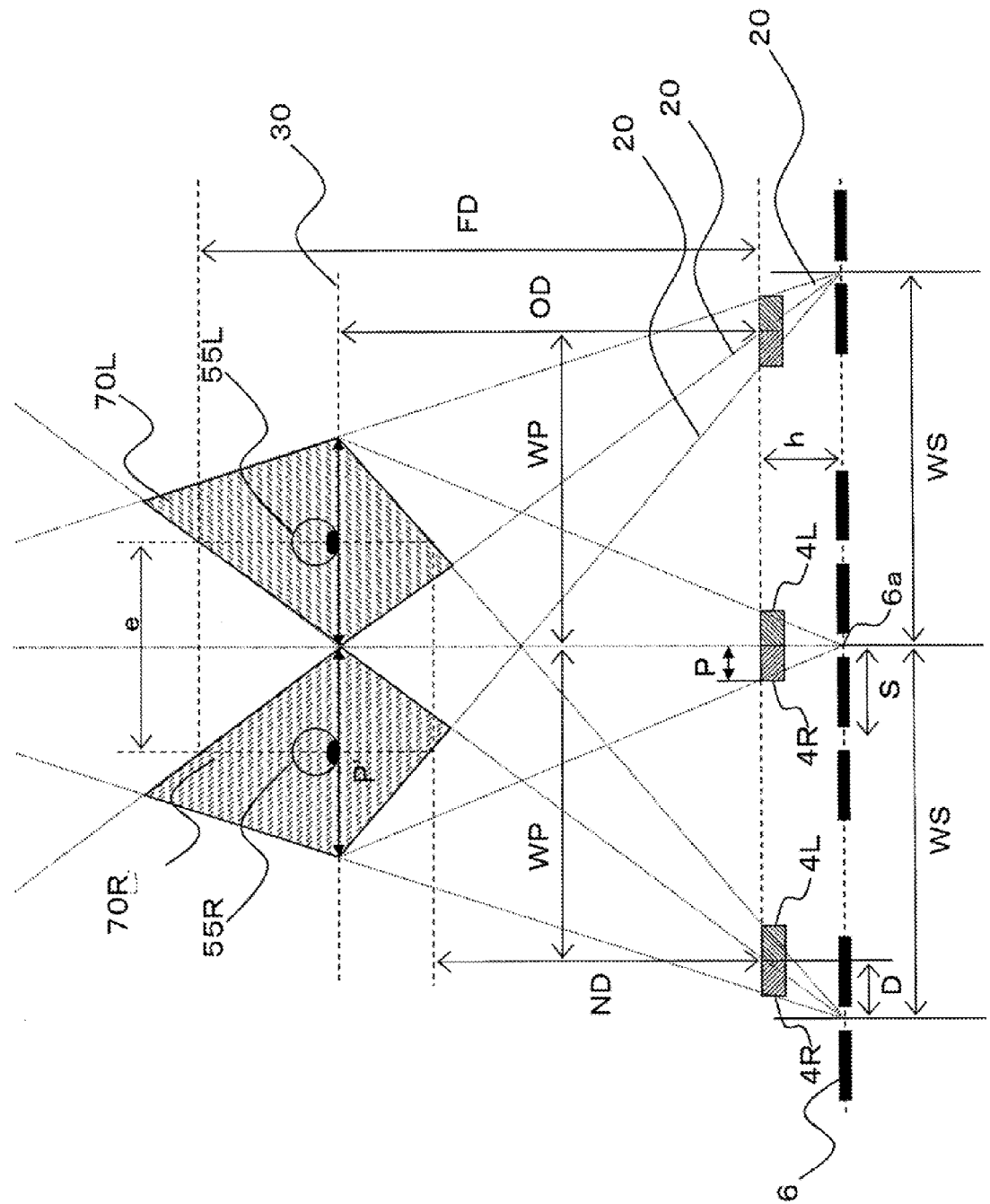
FIG. 1 is a diagram showing an optical model of a parallax-barrier stereoscopic display device with a parallax barrier disposed behind a display panel.
Figure 2:
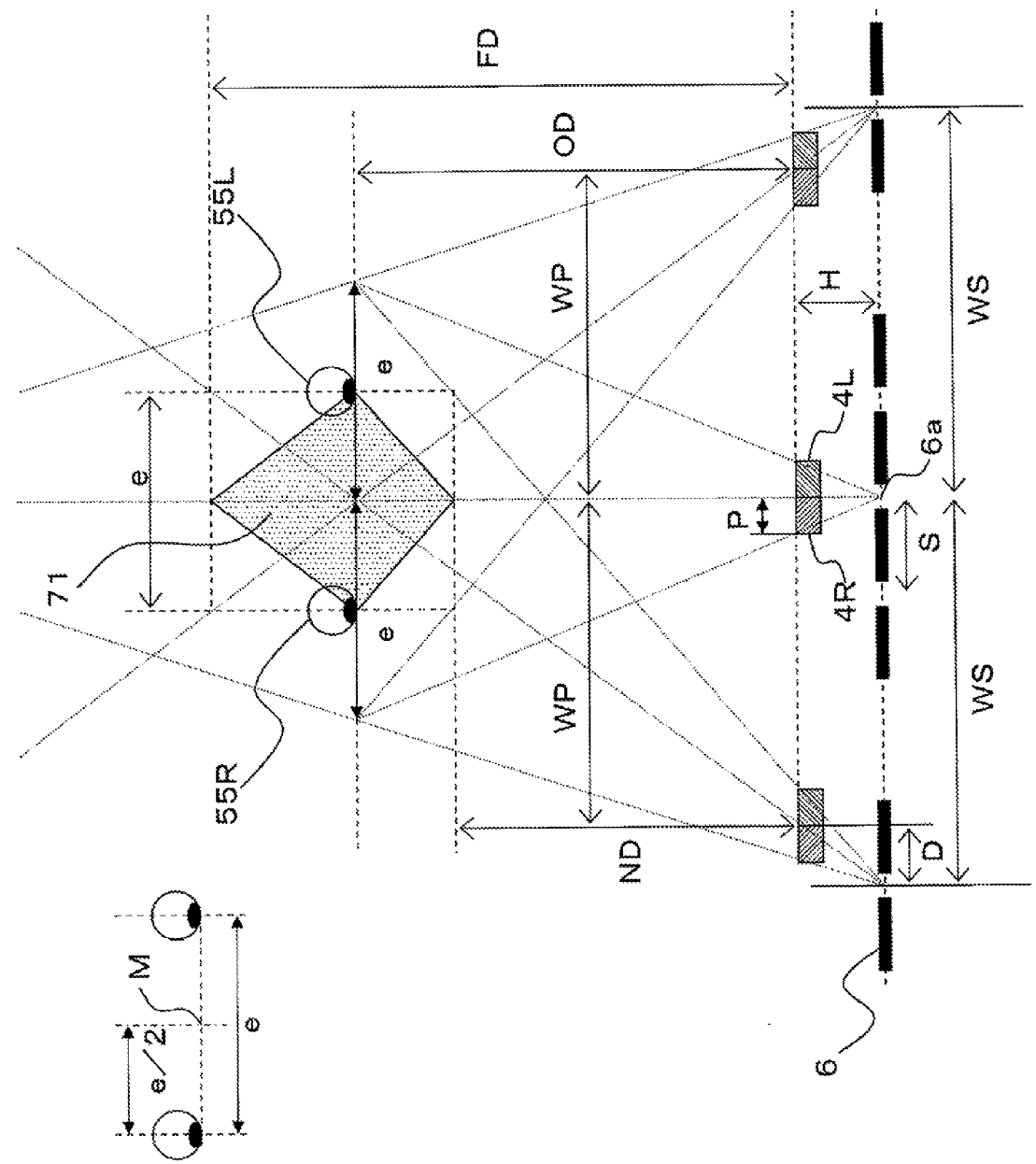
FIG. 2 is a diagram showing a stereoscopic viewing area as an area around midpoint M between the right eye and the left eye of an observer.
Figure 3:
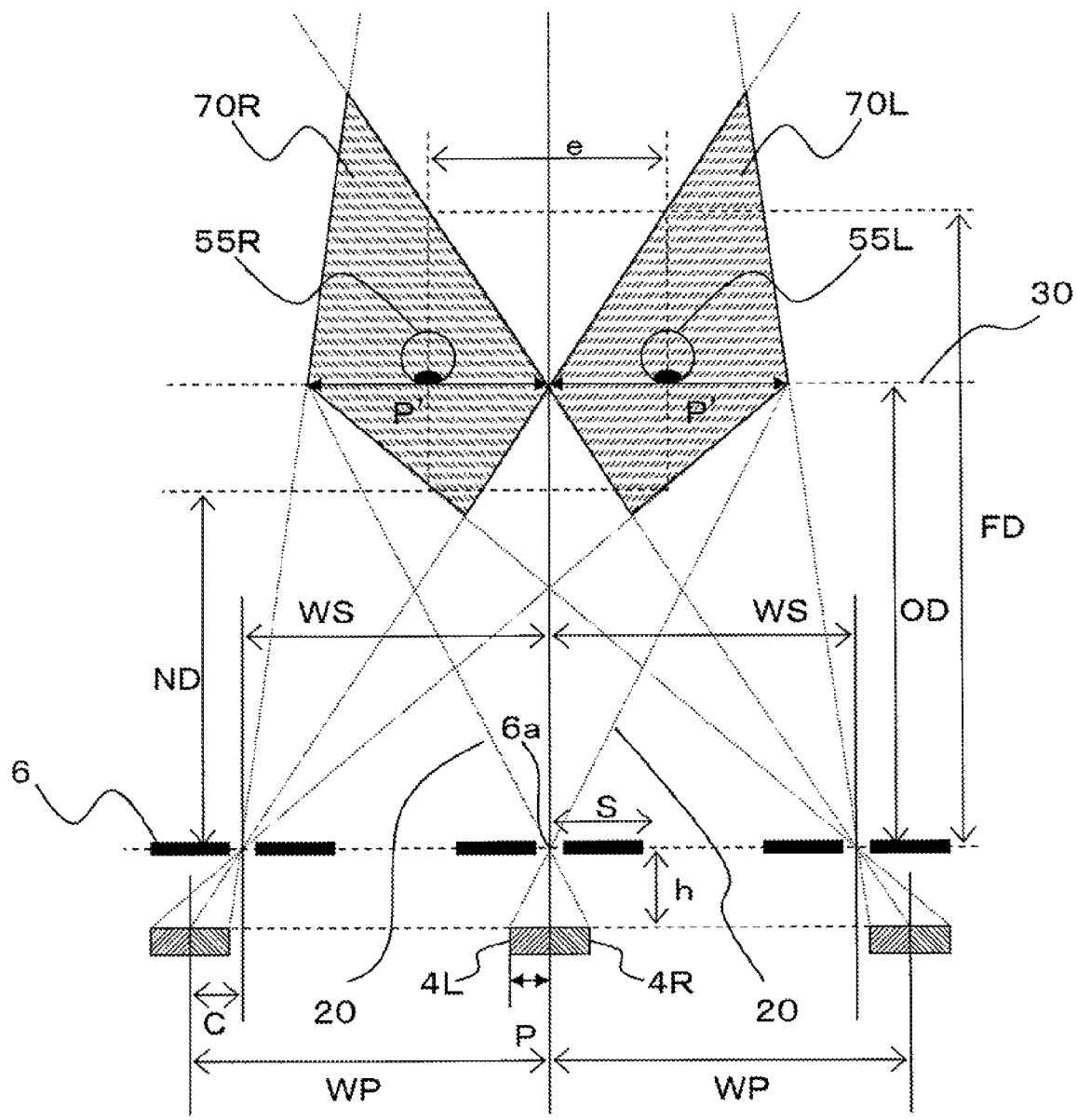
FIG. 3 is a diagram showing an optical model of a parallax-barrier stereoscopic display device with a parallax barrier disposed in front of a display panel.
Figure 4:
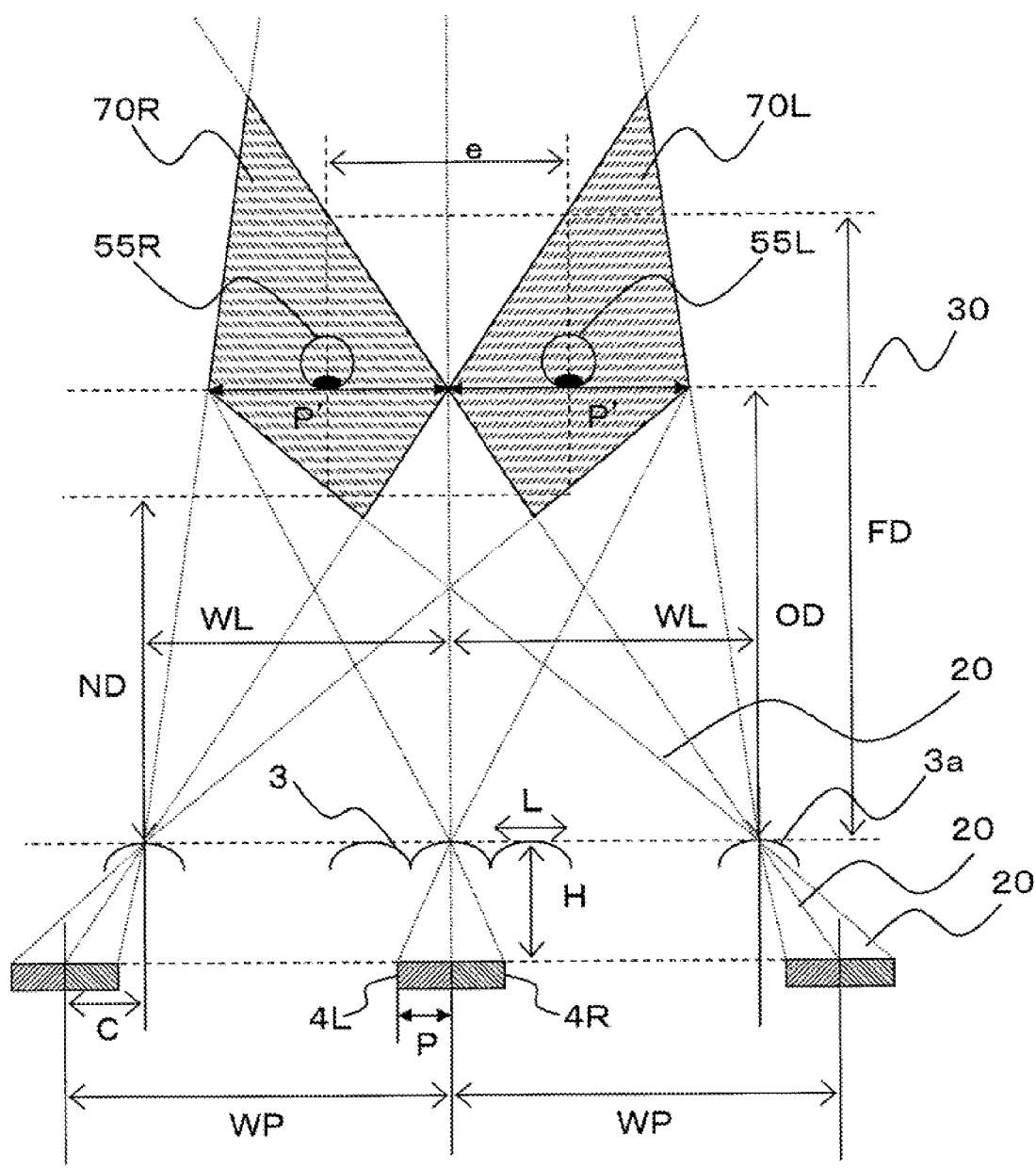
FIG. 4 is a diagram showing an optical model of a stereoscopic display device with a lenticular lens.
Figure 5:
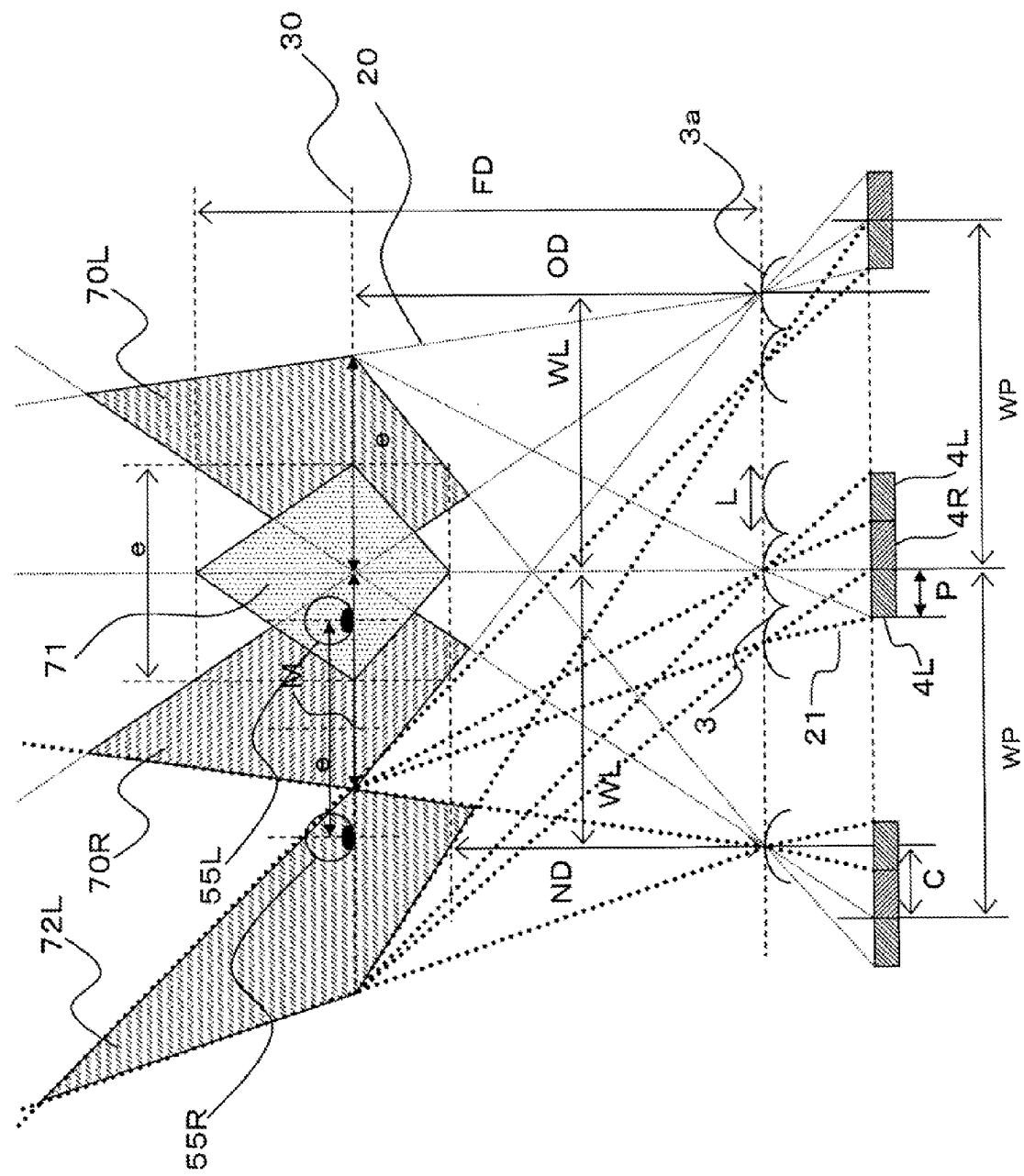
FIG. 5 is a diagram showing an optical model in which the observer is shifted out of a stereoscopic viewing area.
Figure 9A:
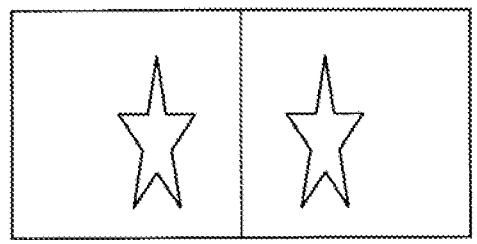
FIG. 9(a) is a diagram showing image data according to first and second exemplary embodiments of the present invention.
Figure 9B:
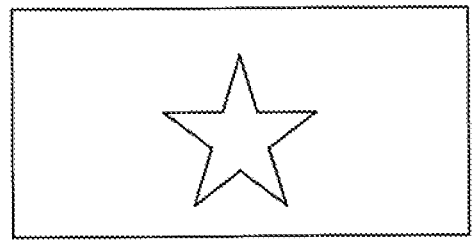
FIG. 9(b) is a diagram showing image data according to the first and second exemplary embodiments of the present invention.

Image data are generated by arithmetic unit 101 which reads data to be displayed from data storage 102 and performs an image processing sequence on the read data. Since the data to be displayed are three-dimensional data including depth information, arithmetic unit 101 should preferably perform a rendering process on the three-dimensional data to generate two-dimensional image data. 3D data used for stereoscopic display, i.e., two-dimensional image data for the left and right eyes having a parallax, are generated by setting two hypothetical viewpoints corresponding to the left and right eyes of the observer and performing a rendering process. 2D data for planar display, i.e., image data free of a parallax, are generated by setting one viewpoint corresponding to the center between the left and right eyes of the observer and performing a rendering process. However, for stereoscopic display of parallax images, the unit pixels of display panel 11 are alternately used as right-eye pixels and left-eye pixels. Therefore, the horizontal resolution of two-dimensional image data to be generated for stereoscopic display is one half of display panel 11. Specifically, 3D data as image data to be generated are shown in FIG. 9(a), and 2D data as image data to be generated are shown in FIG. 9(b).

As described above, image data should preferably be generated from three-dimensional data including depth information. However, data to be displayed which have been subjected to a rendering process may be stored in data storage 102 in advance and then may selectively be read from data storage 102. In other words, two-dimensional image corresponding to FIGS. 9(a) and 9(b) which do not include depth information may be stored, and selected depending on the stereoscopic display or planar display and read. According to this process, as no rendering process is required, arithmetic unit 101 may have a lower processing capability and a lower calculating rate than if a rendering process is used. Therefore, image generator 100 may be of an inexpensive configuration.

As described above, image generator 100 generates 2D/3D data depending on a signal from judging section 90 and outputs the generated 2D/3D data to display panel driving circuit 110. At the same time, image generator 100 has a function to send a signal which makes the barrier effective for stereoscopic display or which makes the barrier ineffective for planar display, to image swapping control circuit 111.

Display panel driving circuit 110 has a function to generate signals (synchronizing signal, etc.) required to drive display panel 11. Image swapping control circuit 111 has a function to generate a signal to display the parallax barrier pattern.

Image swapping means 13 may be an electrooptical device, which can be turned on and off by electric signals, comprising a lenticular lens made up of a plurality of liquid crystal lenses, for example, rather than an electrooptical device for turning on and off a parallax barrier pattern.

In FIG. 8, judging section 90 and image generator 100 include respective independent arithmetic units 92, 101 for illustrative purposes. However, judging section 90 and image generator 100 may share one arithmetic unit. Alternatively, the processing functions may be provided in an arithmetic unit for performing other functions (e.g., a communication control function) of the portable display device to which the present invention is applied, or may be provided in another processor.

A process of determining whether or not both eyes of the observer are positioned in the stereoscopic viewing area will be described below with reference to the drawings. In the description which follows, the image swapping means comprises an electrooptical device for displaying a parallax barrier pattern. However, the image swapping means may comprise a lenticular lens as described above. If the image swapping means comprises a lenticular lens, then the parallax barrier lens may be replaced with the lenticular lens and the slits may be replaced with the principal points of the lenses of the lenticular lens in the description which follows.

Figure 10:
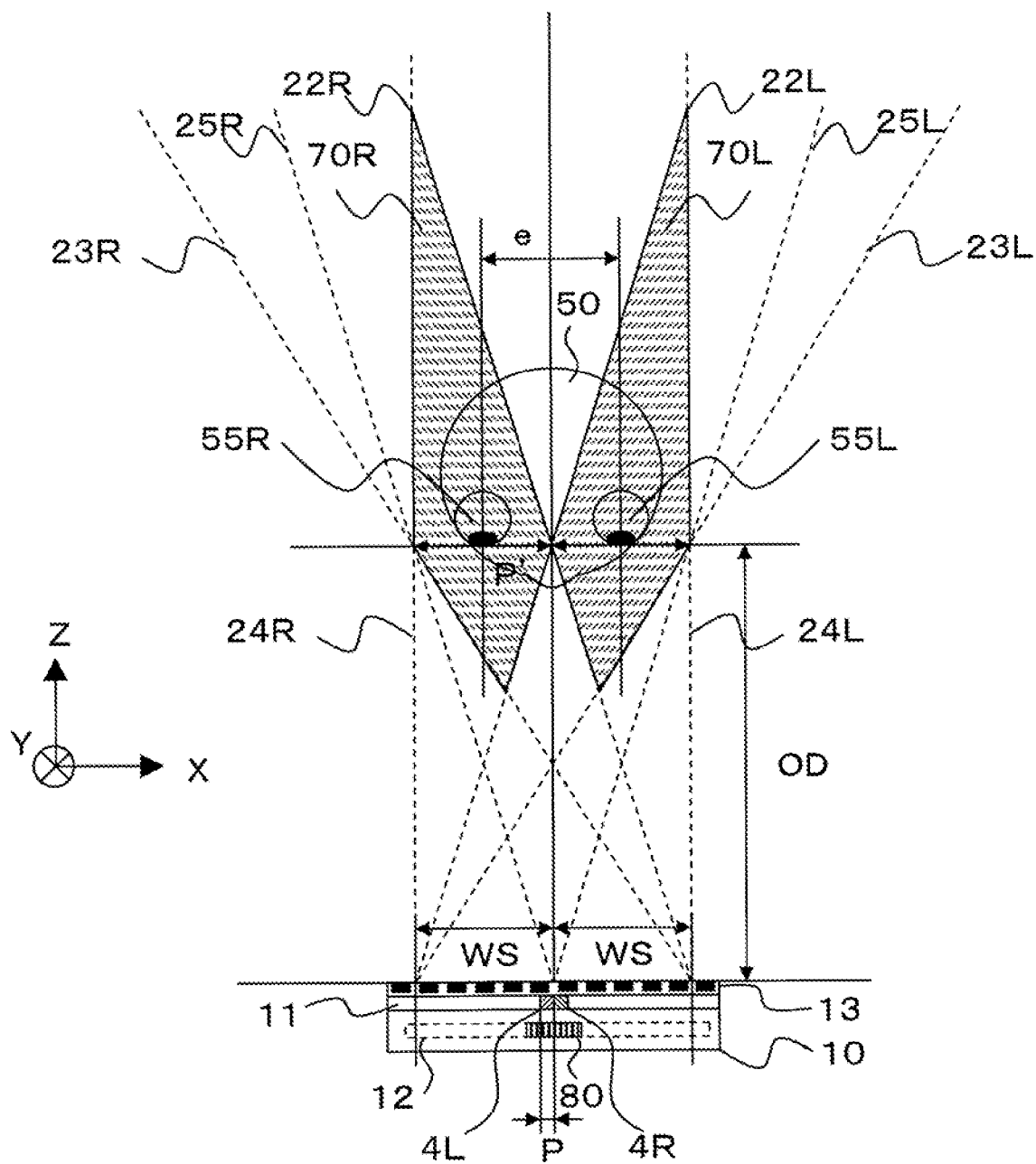
FIG. 10 is a diagram showing an optical model in which the observer observes in an optimum position parallax images on the display device according to the present invention.

FIG. 10 shows an optical model in which observer 50 observes parallax images on the display device according to the present invention.

For illustrative purposes, an XYZ orthogonal coordinate system is defined as follows: A horizontal direction of display panel 11 along which both eyes of observer 50 are arrayed is defined as an X-axis. A direction which is perpendicular to the projected plane (a plane on which a matrix of parallel pixels is present) of the display device and the X-axis is defined as a Y-axis. An axis which perpendicularly crosses the projected plane of the display device is defined as a Z-axis. Positive and negative directions along the X-, Y-, Z-axes are defined as shown in FIG. 10.

In FIG. 10, it is assumed that observer 50 and the display device are in a positional relationship optimum for stereoscopic vision, the distance from image swapping means 13 to both eyes 55R, 55L of the observer serves as optimum observation distance OD, and the XY plane which is spaced distance OD from image swapping means 13 serves as an optimum observation plane.

Image swapping means 13 is functioning as a parallax barrier, and have a central slit and end slits which are spaced a part from each other by distances WS.

Display panel 13 includes a plurality of unit pixels and uses them alternately as left-eye pixels 4L and right-eye pixels 4R in the X-axis direction. However, only left-eye pixel 4L and right-eye pixel 4R at the center are illustrated. If the pitch (width) of unit pixels is represented by P, then the width at the optimum projection plane of an image projected from a slit which is positioned at a shortest distance from each pixel is represented by P'. Light rays which form images P' projected from left-eye pixels and right-eye pixels at opposite ends and center of display panel 11 are represented by 22R, 23R, 24R, 25R, 22L, 23L, 24L, 25L.

As shown in FIG. 10, display panel 11 and image swapping means 13 should preferably be designed such that images P' projected from all the right-eye pixels are superposed at the optimum projection plane and images P' projected from all the left-eye pixels are superposed at the optimum projection plane. P' should preferably be set to be equal to inter-eye distance e of the observer.

Optimum projection plane OD is of a designed value. Under the above design conditions, right-eye area 70R and left-eye area 70L, for the observer to have appropriate stereoscopic vision, are determined from light rays 22R, 23R, 24R, 22L, 23L, 24L emitted from the slits at the opposite ends of the image swapping means, as shown in FIG. 10.

FIG. 11 shows an optical model in which width P' of the images projected from the pixels is not equal to inter-eye distance e of the observer.

As described above in the background art, the stereoscopic viewing area is smaller when P'<e. When P'>e, right-eye area 70R and left-eye area 70L can be greater. However, since it is impossible to place the eyes of the observer in any desired positions, the stereoscopic viewing area is not widened due to the limitation of the inter-eye distance. If P'<e, then the distance between the pixels and the parallax barrier may be large, resulting in an advantage in which there is an increased choice of components in the designing of the display device. If P'>e, then when the observer is shifted from an optimum observational position, it is possible to reduce an area in which opposite parallel images are projected onto the left and right eyes, resulting in a reversed protrusion depth (so-called pseudo-stereoscopic image). In the description which follows, display panel 11 with P'=e is used for an optical model. However, a display panel with P'<e or P'>e may also be used in the present invention.

FIG. 10 shows an optical model in which WS and width P' of projected images are equal to each other, i.e., WS and inter-eye distance e of the observer are equal to each other.

Figure 12B:
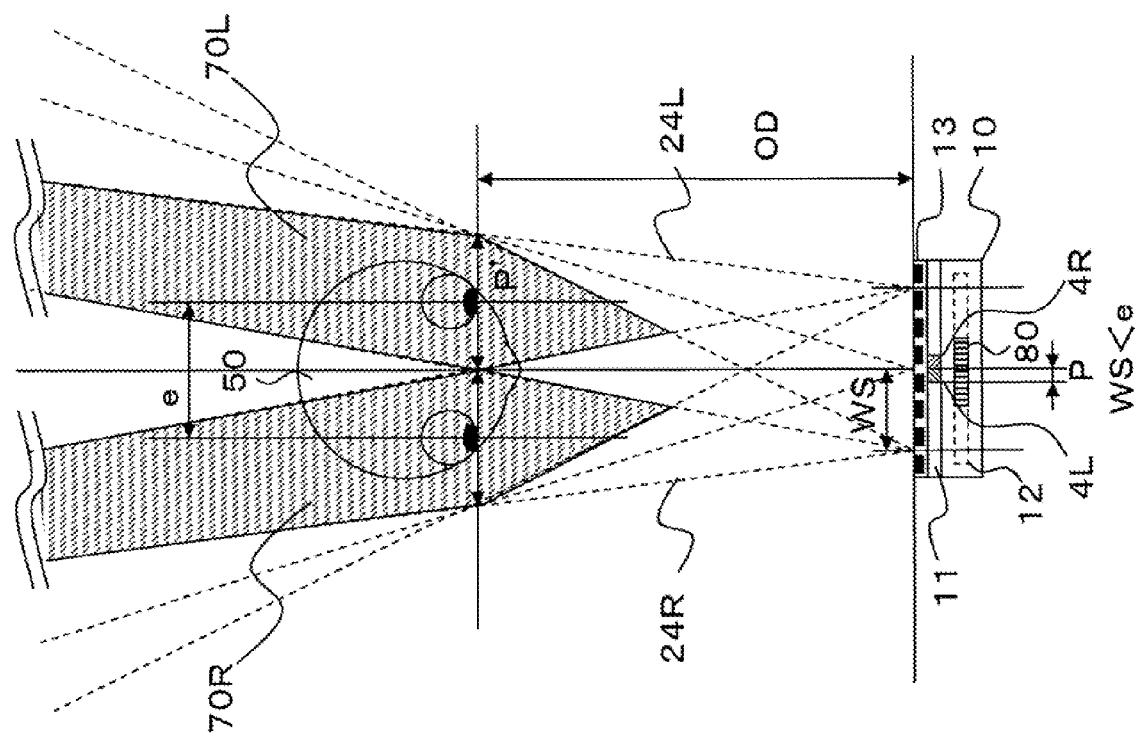
FIG. 12(b) is a diagram showing an optical model in which the distance between a central slit and an end slit of an image swapping means is not equal to the inter-eye distance of the observer in the display device according to the present invention.

FIG. 12 shows optical models in which WS>e (=P') and WS<e (=P'). FIG. 12(a) shows an optical model in which WS>e, and FIG. 12(b) shows an optical model in which WS<e.

Right-eye area 70R and left-eye area 70L for observer 50 to be able to have stereoscopic vision are narrower in the front-back direction for WS>e and wider in the front-back direction for WS<e when they are designed having the same optimum observation distance OD. Based on the average inter-eye distance of adult people, inter-eye distance e should suitably be designed in the range from 62 mm to 65 mm. If e=63 mm, then the stereoscopic display device shown in FIG. 10 has a horizontal dimension of WS×2=126 mm. In view of the size of portable display devices, either one of relationships WS>e, WS=e, WS<e is applicable. In the description which follows, the optical model with WS=e is used for illustrative purposes.

As shown in FIGS. 10 through 12(a), 12(b), right-eye area 70R in which the projected images for the right-eye are superposed and left-eye area 70L in which the projected images for the left-eye are superposed are determined based on the design conditions. Though the sizes of the areas vary depending on the design conditions, the areas of the completed display device do not vary when it displays stereoscopic images, but are inherent in the display device. If right-eye area 70R and left-eye area 70L which are derived from the design conditions, or right-eye area 70R and left-eye area 70L which are measured from the completed display device are stored as data of the stereoscopic viewing area, then data of the positions of both eyes of the observer are acquired, and the stored data and the acquired data are compared with each other by the arithmetic unit, which then determines whether or not both eyes of the observer are positioned in the stereoscopic viewing area. The stereoscopic viewing area and the positions of both eyes of the observer are relatively related to each other. Therefore, if both eyes of the observer are not moved from the optimum observational position, then it is determined whether or not stereoscopic vision is possible depending on movement of display device casing 10. The display device according to the present invention determines whether or not both eyes of the observer are positioned in the stereoscopic viewing area by storing the data of the stereoscopic viewing area and detecting movement of display device casing 10.

For judging stereoscopic vision, it is preferable to store the boundary information of the diamond shapes of right-eye area 70R and left-eye area 70L. The boundary information of the diamond shapes shown in FIGS. 10 through 12(a), 12(b) is determined by light rays 22R, 23R, 24R, 22L, 23L, 24L shown in FIG. 10.

However, if all images P' projected from the left-eye pixels and the right-eye pixels are not superposed, for example, then light rays 25R, 25L shown in FIG. 10 represent the boundaries of areas 70R, 70L, respectively. Depending on the size of an area (3D crosstalk area) in which the projected images for the left and right eyes are superposed to cause the observer to view a dual image, the boundary information can also be determined by light rays in view of the size of such an area. As a consequence, the boundary information may be representative of a polygonal shape other than the diamond shape. However, it is possible to judge stereoscopic vision without the boundary information of a polygonal shape which represents the information of the left-eye area and the right-eye area, depending on the design conditions of the display device. An example of such a judging process will be described below.

The positional relationship between casing 10 and observer 50 shown in FIG. 10 is regarded as representing the optimum observational position, and the range in which stereoscopic vision is possible when observer 50 is not moved, but when casing 10 is moved will be described below with reference to the drawings.

FIG. 13 is a set of diagrams showing limitations on stereoscopic vision at the time casing 10 is moved parallel to the X-axis.

Figure 13A:
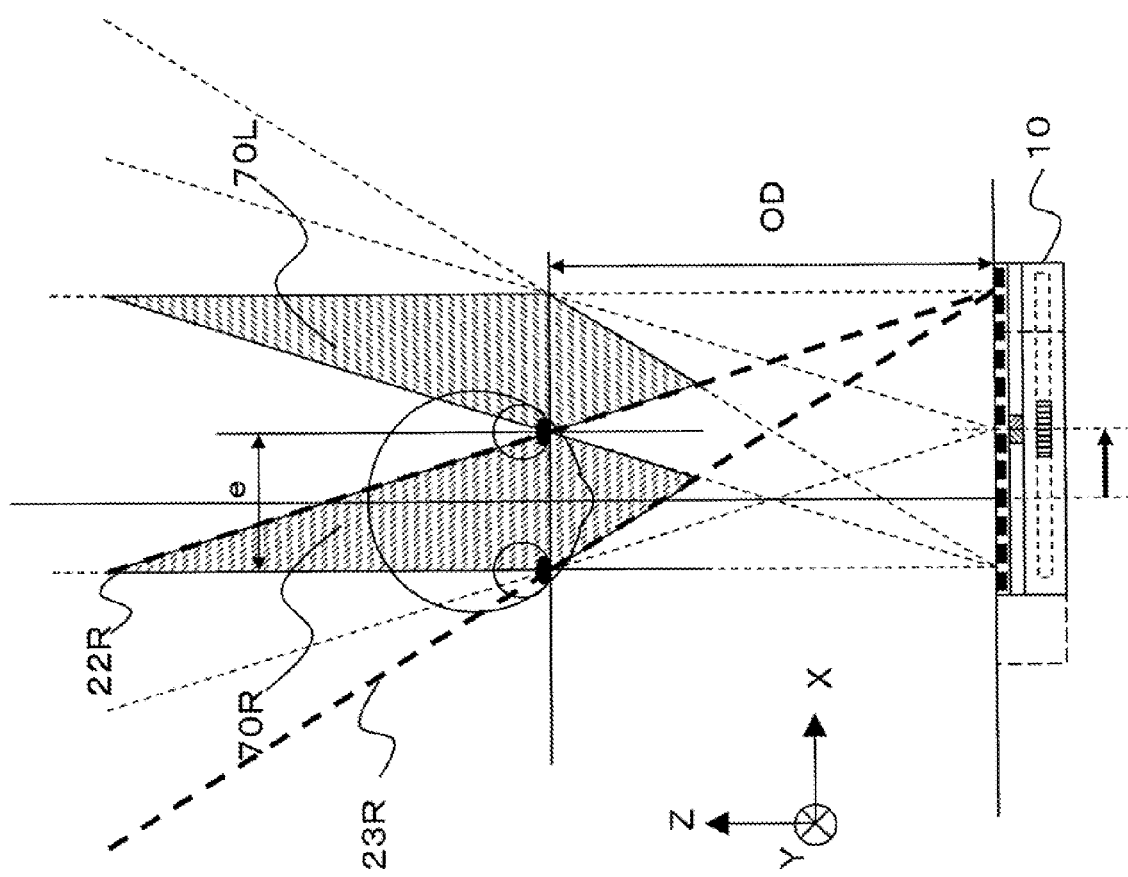
FIG. 13(a) is a diagram showing an optical model in which the display device according to the present invention is moved along an X-axis.
Figure 13B:
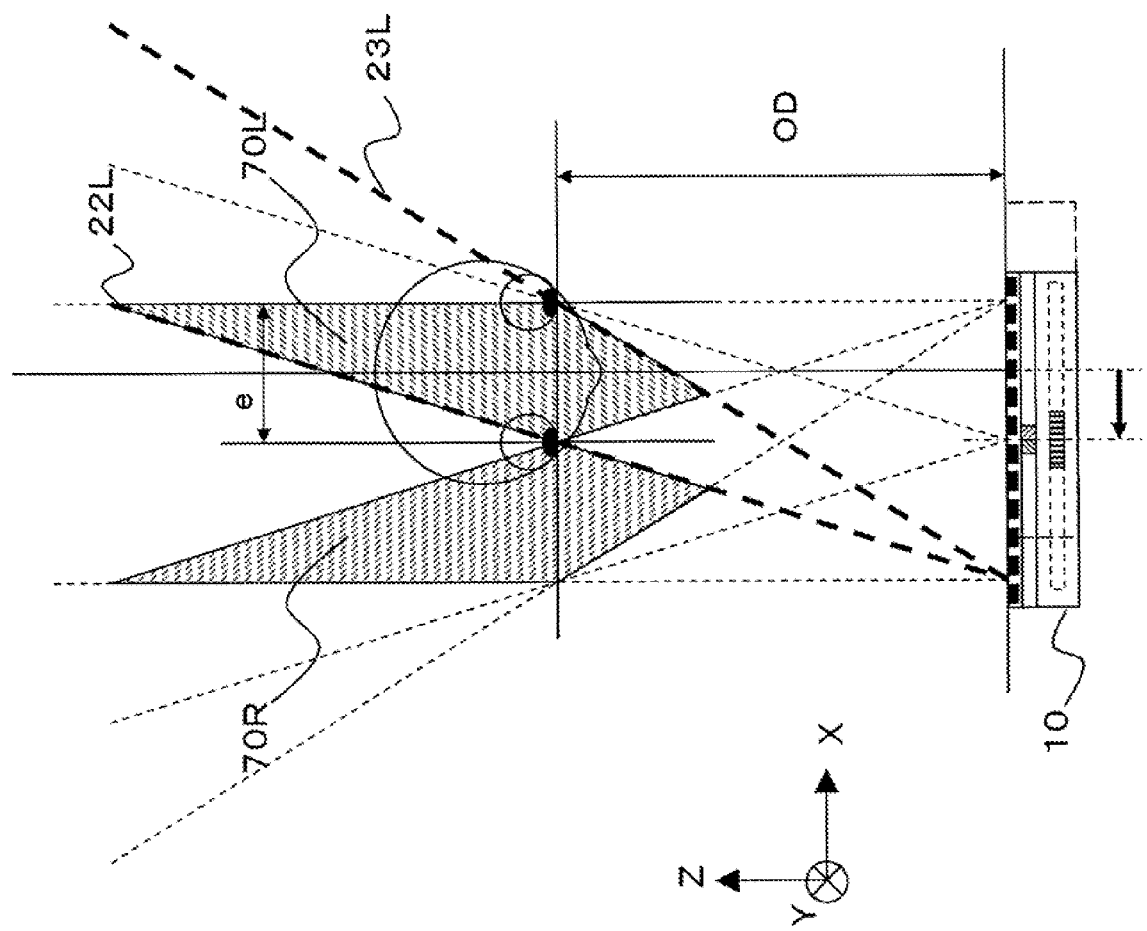
FIG. 13(b) is a diagram showing an optical model in which the display device according to the present invention is moved along the X-axis.

FIG. 13(a) is a diagram showing an optical model in which casing 10 is moved in a positive (+) direction along the X-axis, and FIG. 13(b) is a diagram showing an optical model in which casing 10 is moved in a negative (−) direction along the X-axis. Observer 50 is able to have appropriate stereoscopic vision when right eye 55R is in right-eye area 70R and left eye 55L is in left-eye area 70L. Therefore, the distance of movement in the positive (+) direction along the X-axis is limited when light rays 22R, 23R emitted from the display device are aligned with both eyes of the observer. The distance of movement in the negative (−) direction along the X-axis is limited when light rays 22L, 23L emitted from the display device are aligned with both eyes of the observer.

FIG. 14 is a set of diagrams showing limitations on stereoscopic vision at the time casing 10 is moved parallel to the Z-axis.

Figure 14A:
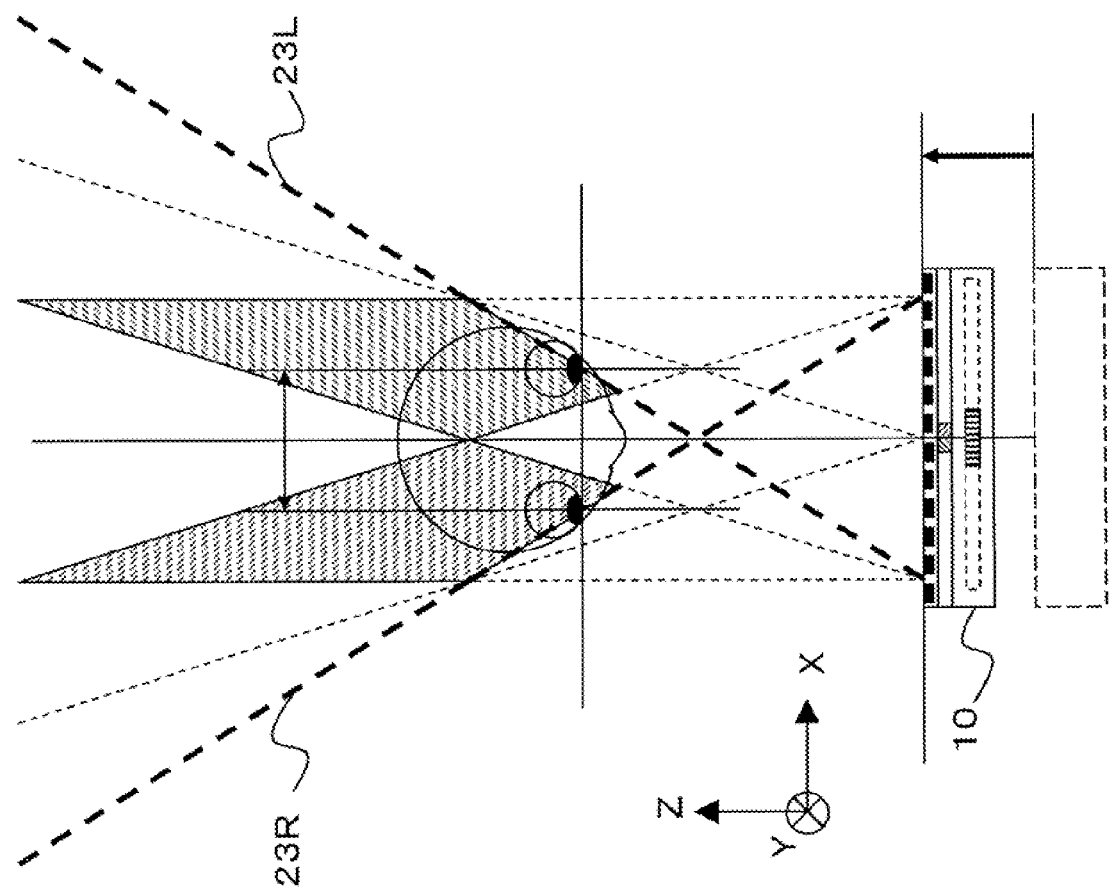
FIG. 14(a) is a diagram showing an optical model in which the display device according to the present invention is moved along a Z-axis.
Figure 14B:
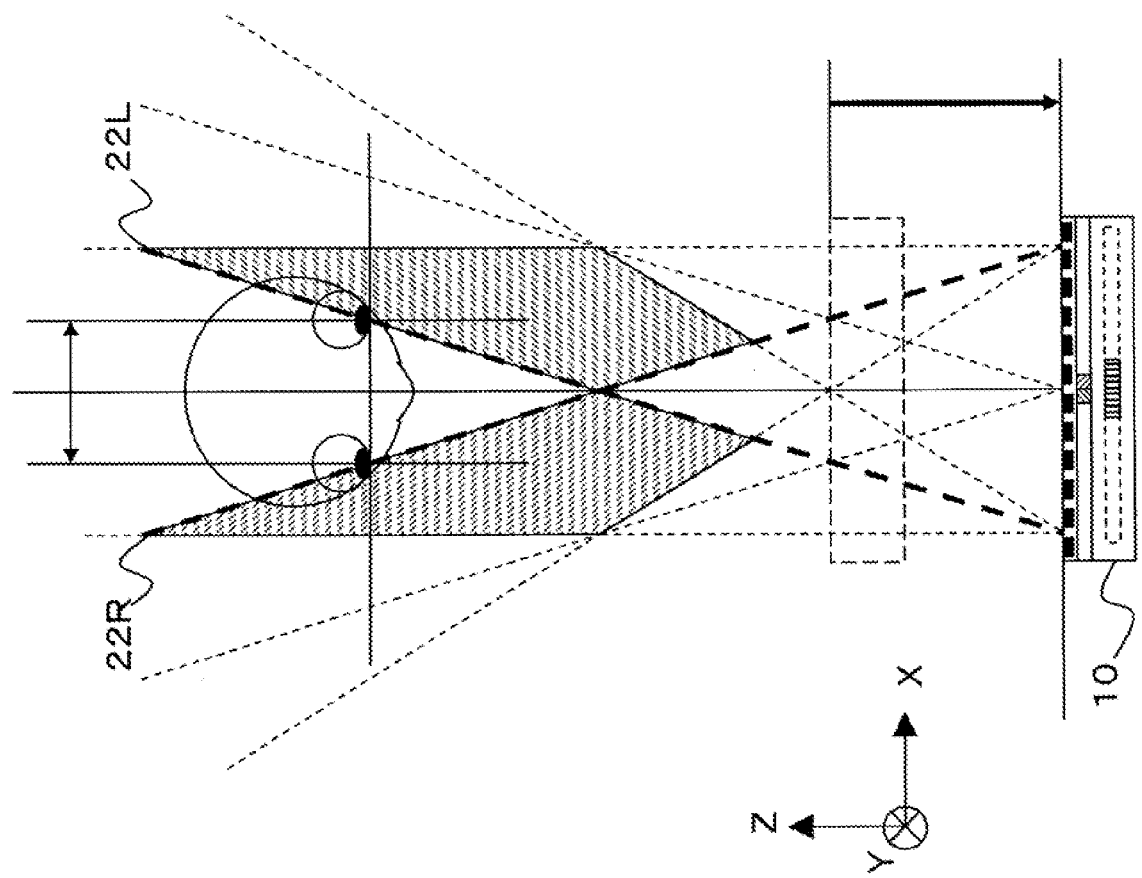
FIG. 14(b) is a diagram showing an optical model in which the display device according to the present invention is moved along the Z-axis.

FIG. 14(a) is a diagram showing an optical model in which casing 10 is moved in a positive (+) direction along the Z-axis, and FIG. 14(b) is a diagram showing an optical model in which casing 10 is moved in a negative (−) direction along the Z-axis. The distance of movement in the positive (+) direction along the Z-axis is limited when light rays 23R, 23L emitted from the display device are aligned with both eyes of the observer. The distance of movement in the negative (−) direction along the Z-axis is limited when light rays 22L, 22L emitted from the display device are aligned with both eyes of the observer.

FIG. 15 is a set of diagrams showing limitations on stereoscopic vision at the time casing 10 is moved in the directions of the X- and Z-axes while remaining parallel to the surface of display panel 11 and the observation plane including both eyes of observer 50.

Figure 15A:
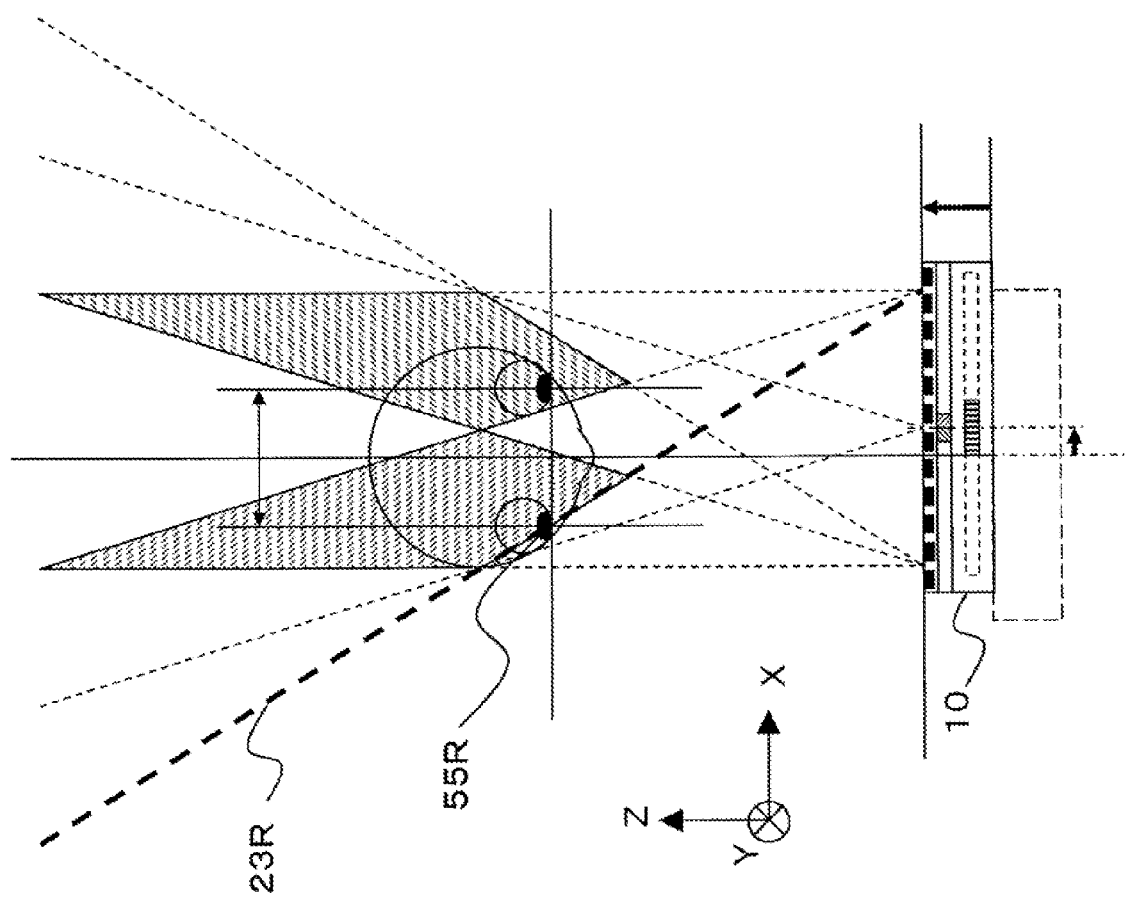
FIG. 15(a) is a diagram showing an optical model in which the display device according to the present invention is moved along the X-axis and the Z-axis.
Figure 15B:
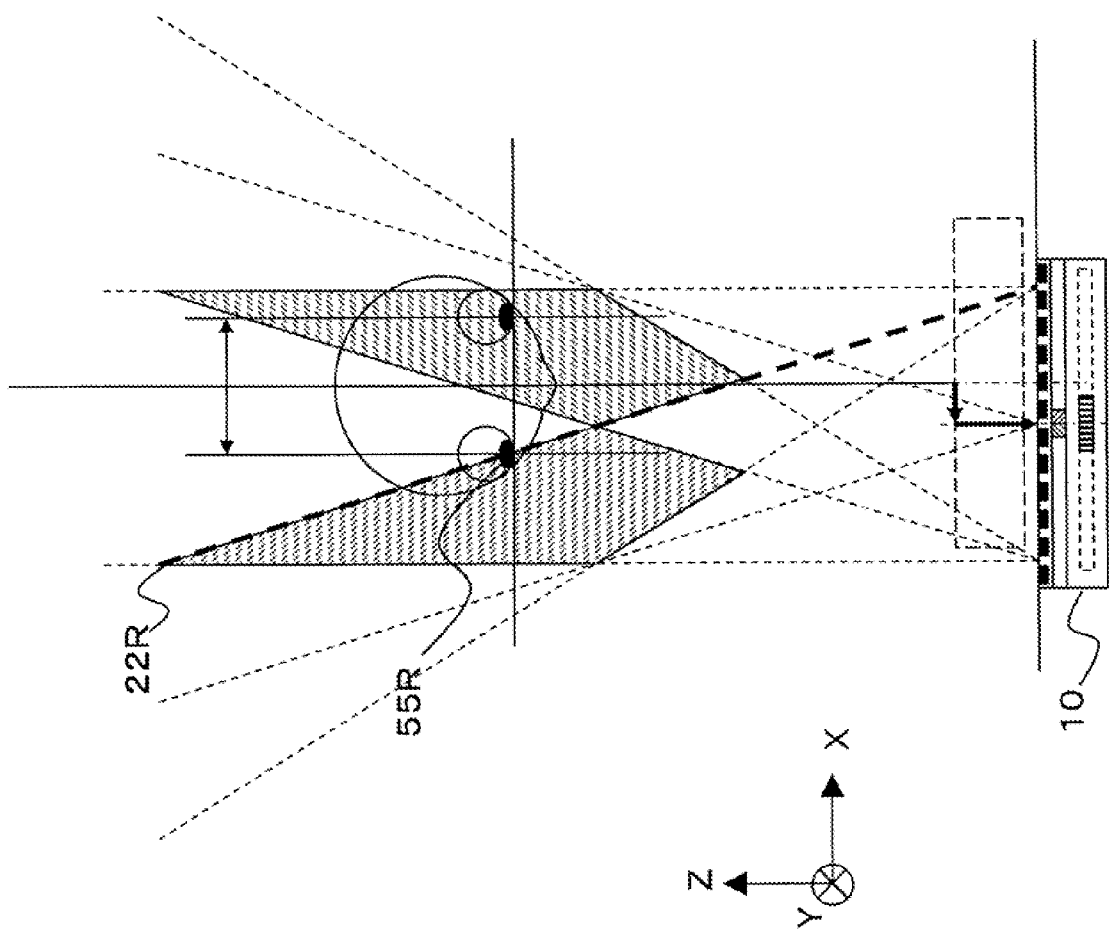
FIG. 15(b) is a diagram showing an optical model in which the display device according to the present invention is moved along the X-axis and the Z-axis.

FIG. 15(a) is a diagram showing an optical model in which casing 10 is moved in the positive (+) direction along the X-axis and the positive (+) direction along the Z-axis. The limitation on appropriate stereoscopic vision by observer 50 is reached when light ray 23R is aligned with right eye 55R. FIG. 15(b) is a diagram showing an optical model in which casing 10 is moved in the negative (−) direction along the X-axis and the negative (−) direction along the Z-axis. The limitation on appropriate stereoscopic vision by observer 50 is reached when light ray 22R is aligned with right eye 55R.

The conditions for limiting stereoscopic vision have been described above with reference to FIGS. 13(a), 13(b) through 15(a), 15(b) in which WS=e. If WS<e and WS>e, light rays 24R, 24L do not contribute to the conditions for limiting stereoscopic vision unless the angle formed between the Z-axis and light ray 24R or 24L is greater than the angle formed between the Z-axis and light ray 22R or 22L in the XZ plane. The conditions limiting stereoscopic vision are given in Table 1 below.

TABLE 1

| | Movement of casing 10 | |
|---|---|---|
| | Movement along Z-axis: positive (+) | Movement along Z-axis: negative (−) |
| Movement along X-axis: positive (+) | Light ray 23R is aligned with right eye 55R | Light ray 22L is aligned with left eye 55L |
| Movement along X-axis: negative (−) | Light ray 23L is aligned with left eye 55L | Light ray 22R is aligned with right eye 55R |

The tilt of light rays 22R, 23R, 24R, light rays 22L, 23L, 24L with respect to the display surface is determined when the stereoscopic display device is designed. Consequently, it is possible to make calculations to determine whether or not stereoscopic vision is possible once the distance that casing 10 moves from the optimum observational position is known.

The above conditions apply when casing 10 is not tilted, i.e., when the surface of display panel 11 and the plane on which both eyes of the observer are positioned remain parallel to each other. When casing 10 is tilted, the limitation on stereoscopic vision needs to be calculated taking into account the angle of tilt of casing 10.

Figure 16A:
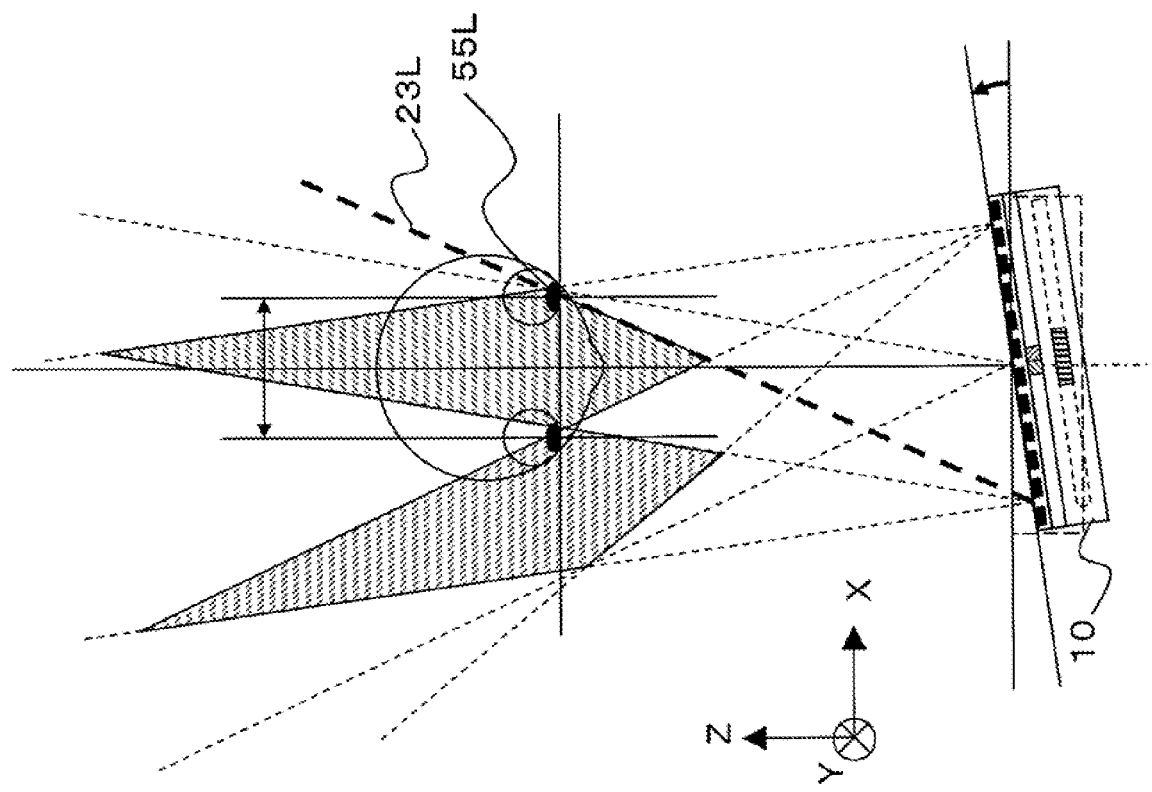
FIG. 16(a) is a diagram showing an optical model in which the display device according to the present invention is tilted around a Y-axis.
Figure 16B:
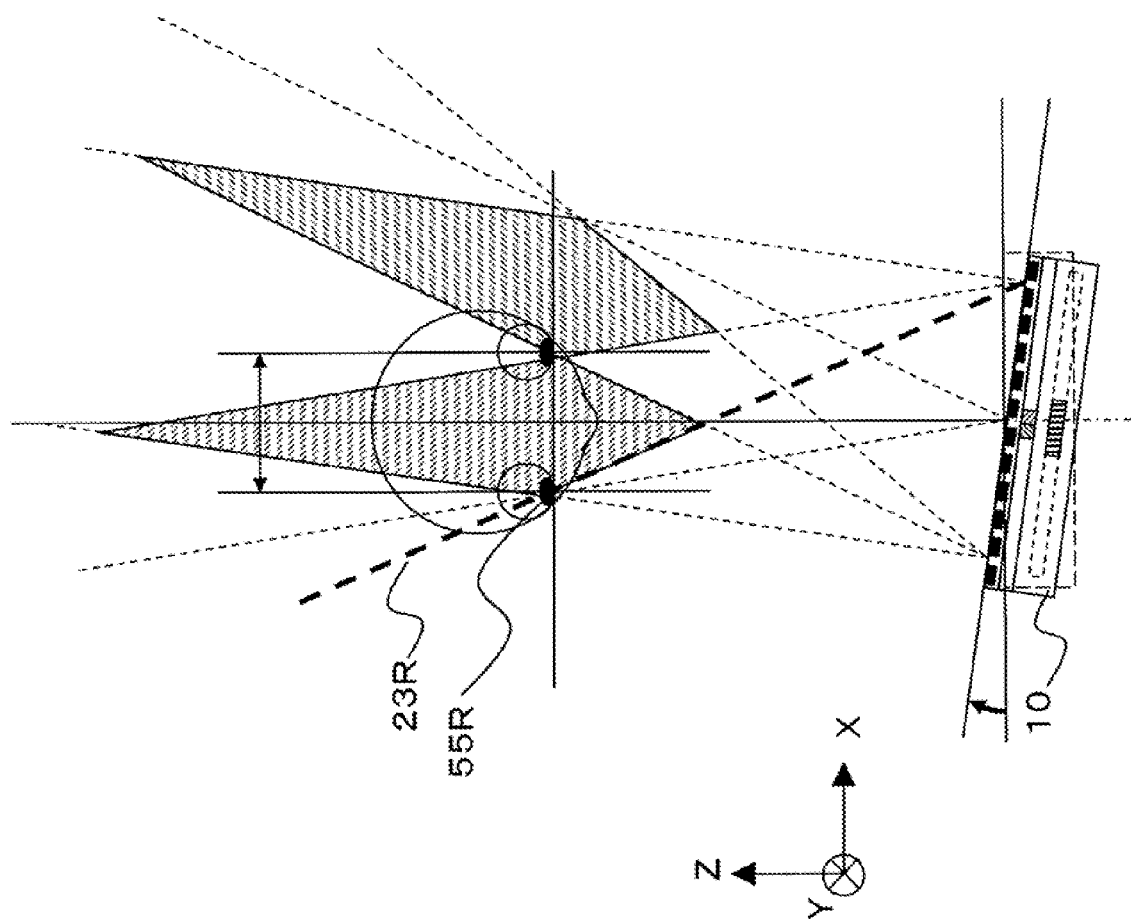
FIG. 16(b) is a diagram showing an optical model in which the display device according to the present invention is tilted around the Y-axis.

FIG. 16 is a set of diagrams showing limitations on stereoscopic vision at the time casing 10 is tilted about the Y-axis on the surface of display panel 11. FIG. 16(a) shows an optical model in which casing 10 is turned to the left about the Y-axis with its positive (+) direction toward the viewer of FIG. 16(a). The limitation on appropriate stereoscopic vision by observer 50 is reached when light ray 23L is aligned with left eye 55L. FIG. 16(b) shows an optical model in which casing 10 is turned to the right about the Y-axis with its positive (+) direction toward the viewer of FIG. 16(a). The limitation on appropriate stereoscopic vision by observer 50 is reached when light ray 23R is aligned with right eye 55R. Since the tilt of light rays 23R, 23L is determined when the display device is designed, it is possible to make calculations to determine whether or not stereoscopic vision is possible once the angle of tilt of casing 10 from the optimum observational position is known.

As described above, it is possible to judge stereoscopic vision based on the distance of movement and the angle of tilt of casing 10 from the optimum observational position, and the angles of light rays 22R, 22L, 23R, 23L with respect to the display panel surface which are determined when the display device is designed.

Specific detecting means of angle-of-tilt detector 81 and distance-of-movement detector 82 of detector 80 will be described below.

A three-axis acceleration sensor used as an example of the angle-of-tilt detector and the distance-of-movement detector will be described below.

Output data from an acceleration sensor include various signals indicative of qualities other than an angle of tilt and the distance of movement to be ascertained. Major ones of those signals are representative of an acceleration component directed toward the earth axis by the gravitational acceleration and a noise component caused by environmental factors such as vibrations which are simultaneously applied to the human body, which is holding the casing, and to the casing itself. The noise component caused by environmental factors such as vibrations can effectively be removed by a filter, most preferably a digital filter. Depending on the characteristics of the environment and the user, it is effective to use a filter which utilizes characteristics in the frequency domain by way of Fourier transform or wavelet transform. A process of detecting a signal which has been processed by the above filtering process will be described below.

Figure 17:
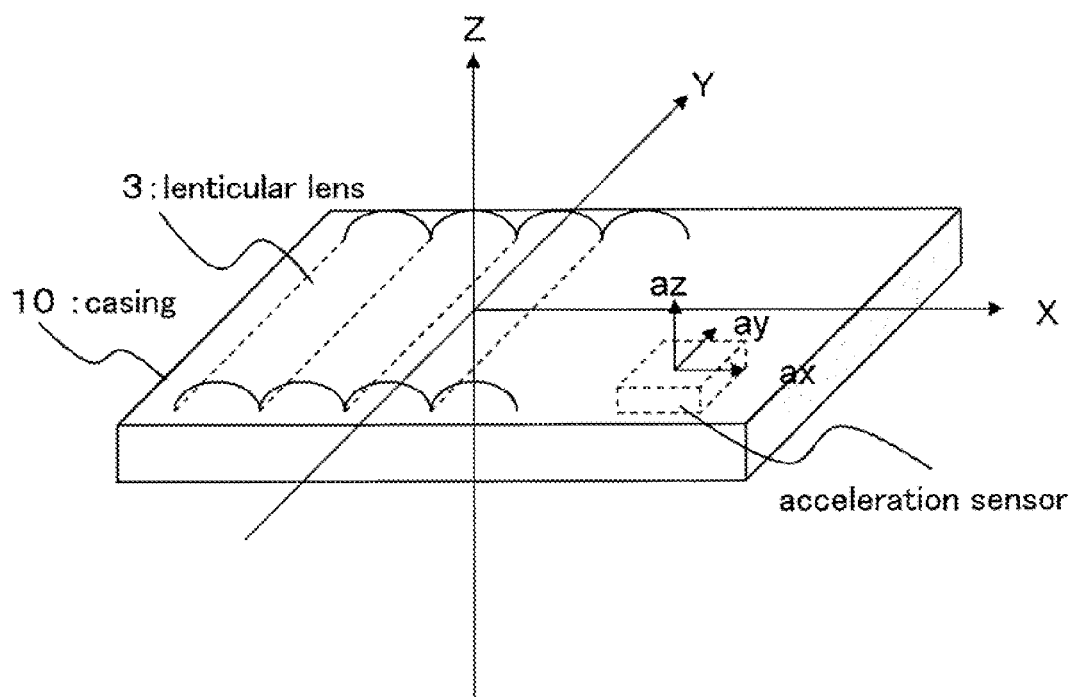
FIG. 17 is a view showing the display device according to the present invention with an acceleration sensor incorporated therein.

FIG. 17 shows an acceleration sensor incorporated in casing 10.

A coordinate system of lenticular lens 3 of the display panel and a coordinate system of the acceleration sensor are defined as shown in FIG. 17. Specifically, the observer is positioned in the positive direction (indicated by the arrow) along the Z-axis, and observes the display panel that is present in the negative direction along the Z-axis. The positive direction along the Y-axis represents an upward direction of the display panel, and the negative direction along the Y-axis represents a downward direction of the display panel. The display panel is often used obliquely to the vertical direction along the earth axis, as shown in FIG. 18.

Figure 18:
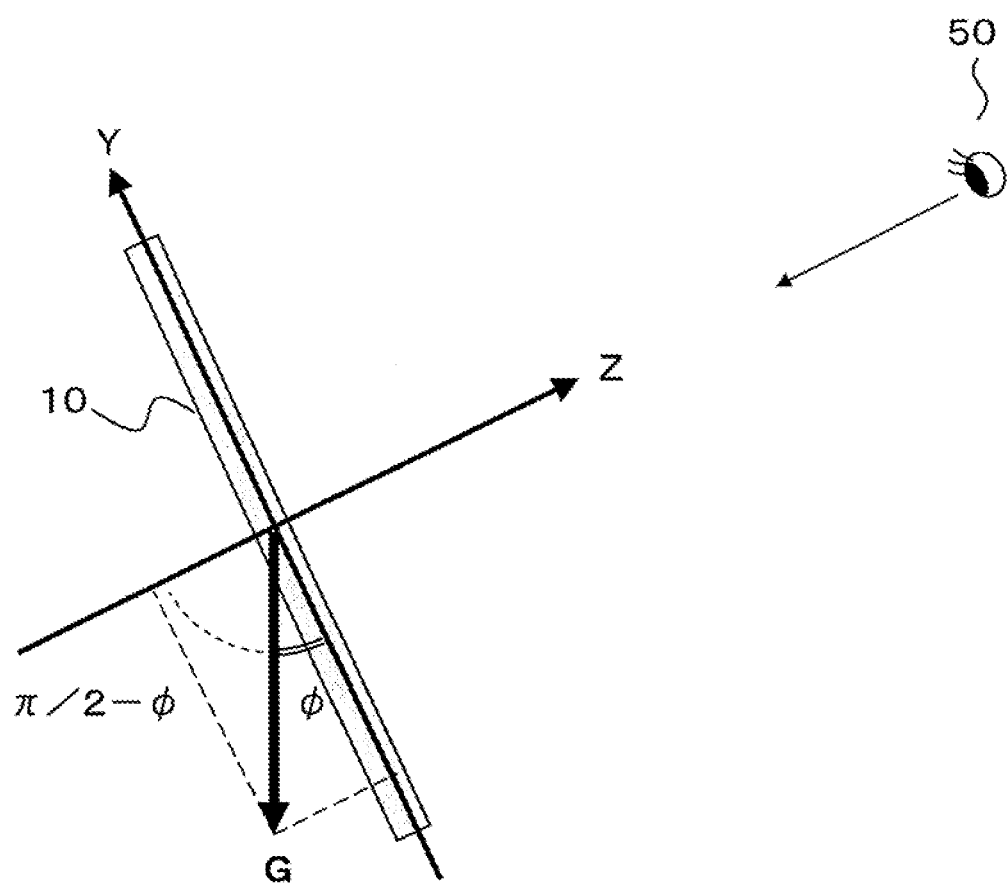
FIG. 18 is a diagram illustrative of the calculation of an angle of tilt based on a gravitational acceleration at the time the display device according to the present invention in which the acceleration sensor incorporated therein is turned about the X-axis.

FIG. 18 is a diagram as seen from a plane including the Y-axis and the Z-axis shown in FIG. 17. The angle of tilt between the display panel and the vertical direction along the earth axis is represented by $\phi$, and the vector of the gravitational acceleration by G.

The distance of movement can be calculated by calculating the speed by integrating the output from the acceleration sensor with respect to time and then by integrating the calculated speed with respect to time. However, it is necessary to pay attention to two points. The first point is concerned with the accumulation of noises caused by the integrating process, and the second point is about the effect that the gravitational acceleration has.

First, the first point about an accumulation of noises will be described below. If a noise is introduced into the detected acceleration, then the speed or the distance of movement changes greatly due to the integrating process even though the noise may be a single shot. Specifically, when a signal with a single noise $\alpha$ introduced therein is integrated, the speed subsequent to the noise changes only by $\alpha \cdot \Delta t$ where $\Delta t$ indicates the time from the introduction of the noise to the end of the integrating process. In the calculation of the distance of movement, it varies by $\alpha \cdot (\Delta t)2$ after the noise is introduced. Therefore, in particular, the distance of movement varies greatly due to the integrating process.

Two processes to be described below are effective to handle the noise. The first process uses a filter for smoothing noise. The second process shortens the integrating time. Specifically, if the integrating time is reduced, $\Delta t$ is reduced, resulting in a reduction in the variation of the distance of movement due to noise. By adding the reduced distance of movement produced in the reduced integrating time, the distance of movement can be calculated in a desired time.

The second point about the gravitational acceleration will be described below. Since the gravitational acceleration is present at all times, it is introduced into the outputs of all acceleration sensors. In order to eliminate the effect that the gravitational acceleration has, initial outputs ax0, ay0, az0 of the acceleration sensor are recorded, and only the differences between subsequent outputs of the acceleration sensor and the initial outputs of the acceleration sensor are used in the integrating process.

The above process makes it possible to calculate the distance of movement without being affected by the gravitational acceleration. If there is no rotation about the Z-axis, then the gravitational acceleration does not affect ax. Therefore, if no rotation about the Z-axis is observed, only initial outputs ay0, az0 may be recorded and the differences may be taken to calculate the distance of movement more simply.

As to the angle of tilt, the display panel may be tilted in various ways. The display panel may pitch, roll, and yaw about respective coordinate axes as is the case with airplanes and cars. Since any tilting movement can be expressed by a combination of pitching, rolling, and yawing, all tilting movements can easily be analyzed by analyzing basic pitching, rolling, and yawing movements.

The relationship between a coordinate system and pitching, rolling, and yawing is defined as follows: Pitching is defined as rotation about the X-axis. Specifically, pitching refers to rotation of the display panel in a direction to bring the upper end (+Y) thereof toward the observer or in a direction to bring the lower end (−Y) thereof toward the observer. Rolling is defined as rotation about the Y-axis. Specifically, rolling refers to rotation of the display panel in a direction to bring the right end (+X) thereof toward the observer or in a direction to bring the left end (−X) thereof toward the observer. Yawing is defined as rotation about the Z-axis. Specifically, yawing refers to rotation of the display panel about the direction of view of the observer within a plane which faces the observer.

Pitching can be determined as follows:

FIG. 18 shows a plane including the Y-axis and the Z-axis and gravitational acceleration G in that plane.

The display panel is displaced only about the X-axis. An acceleration sensor in the Y-axis direction detects a component of the gravitational acceleration along the Y-axis, i.e., detects $-G \cdot \cos(\phi)$ which is a component of the gravitational acceleration that is mapped onto the Y-axis. When the observer holds casing 10 in an attitude that is easy for stereoscopic vision while at rest, the output of the acceleration sensor is stored as an initial value representative of the component of the gravitational acceleration that is mapped onto the Y-axis. If the output of the acceleration sensor along the Y-axis direction in the initial state that is easy for observation is represented by ay0, then ay0=$-G \cdot \cos(\phi)$. Since the gravitational acceleration is of a substantially constant value on the ground, a pitch angle $\phi 0$ in the initial state that is easy for observation is determined as $\phi 0 = \arccos(-ay0/G)$.

Similarly, a pitch angle $\phi$ at the time that the angle of tilt is changed is given as $\phi = \arccos(-ay/G)$ using the output ay of the acceleration sensor at the time. The pitch angle $\phi$ makes it possible to obtain a change from the pitch angle $\phi 0$ in the initial state and a change in, the pitch angle from time to time.

Rolling, which greatly affects the visibility of stereoscopic vision, can be determined in the same manner as with pitching. In this case, the display panel is displaced only about the Y-axis. A gravitational acceleration component in the Y-axis direction is the same as that shown in FIG. 18 and is represented as $-G \cdot \cos(\beta)$. A gravitational acceleration component in the Z-axis direction is represented as $-G \cdot \sin(\phi)$ in FIG. 18 where there is no rotation about the Y-axis. If there is rotation about the Y-axis, however, then the gravitational acceleration is divided into a component in the Z-axis direction and a component in the X-axis direction, as shown in FIG. 19.

Figure 19:
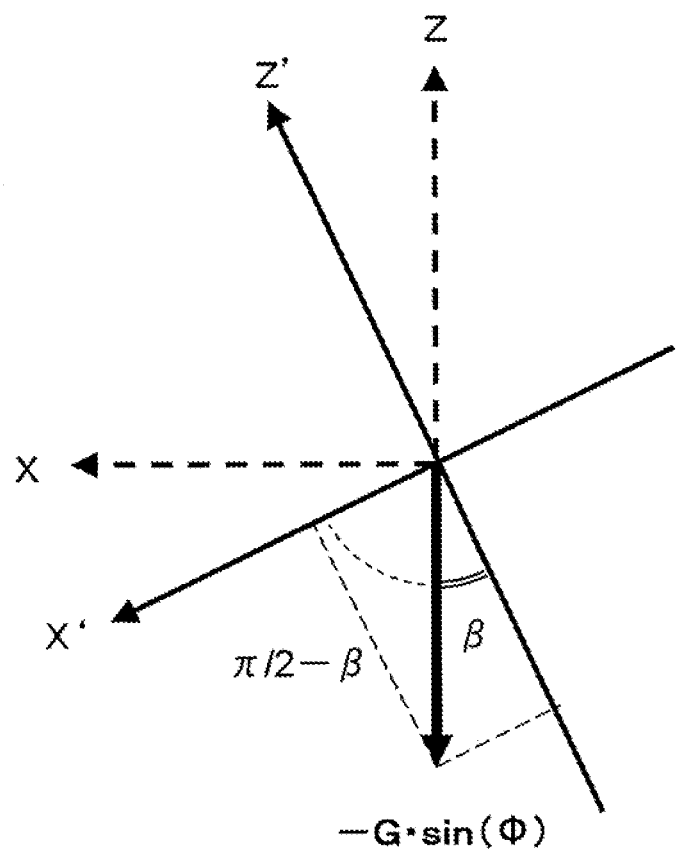
FIG. 19 is a diagram illustrative of the calculation of an angle of tilt based on a gravitational acceleration at the time the display device according to the present invention in which the acceleration sensor incorporated therein is turned about the Y-axis.

In FIG. 19, an X-axis and a Z-axis which are indicated by the broken lines represent the axis directions before the display panel rotates about the Y-axis. At this time, a component of the gravitational acceleration which is perpendicular to the Y-axis extends in the negative direction along the Z-axis and is represented as $-G \cdot \sin(\phi)$. When the display panel rotates about the Y-axis through an angle β, the X-axis and the Z-axis are displaced respectively to an X'-axis and a Z'-axis shown in FIG. 19. A component of the gravitational acceleration on the Z'-axis is represented by $-G\cdot\sin(\phi)\cdot\cos(\beta)$. If an initial state in the Z-axis direction is determined in advance in the same manner as when the initial state is determined for pitching, then $-G\cdot\sin(\phi)$ which represents a gravitational acceleration component on the Z-axis for β=0 is detected as the output az0 of an acceleration sensor in the Z-axis direction. A roll angle β at the time the angle of tilt is changed is given as $\beta = \arccos\{-az/[G\cdot\sin(\phi)]\}$ using the output az of the acceleration sensor at the time. The roll angle β makes it possible to obtain a change in the roll angle from time to time.

While the three-axis acceleration sensor has been described above by way of example in the present exemplary embodiment, pitching and rolling can obviously be detected by a two-axis acceleration sensor.

The process of detecting an angle of tilt and the distance of movement has been described above by way of example. An angle of tilt may be detected by a geomagnetic sensor, and a distance of movement may be detected by an acceleration sensor. A process of detecting an angle of tilt with a three-axis geomagnetic, sensor is similar to the above process of detecting an angle of tilt with the acceleration sensor except that the gravitational acceleration is replaced with geomagnetism. An angle of tilt may further be detected by an angular velocity sensor or a gyrosensor, and a distance of movement may further be detected by a small-size camera or an ultrasonic transmission source and an ultrasonic sensor.

[Description of the Operation]

Operation of the present exemplary embodiment will be described below with reference to a flowchart shown in FIG. 20.

At the same time that stereoscopic display is started, the sensor for detecting movement of casing 10 is activated.

Then, a reference screen for guiding the observer to the optimum observational position is displayed. The stereoscopic display according to the present exemplary embodiment refers to a process of turning on the function of the image swapping means (e.g., to display a parallax barrier pattern), sending image data with a parallax as shown in FIG. 9(a) to display panel 11, and projecting images respectively onto the left and right eyes of the observer.

In step 1, the observer adjusts the position and tilt of casing 10 so that the displayed reference screen can be seen as a stereoscopic image.

Then, in step 2, with the position and tilt of casing 10 being adjusted by the observer, an output from detector 80 is recorded as an initial value, and desired contents are played back for stereoscopic display.

In step 3, a distance of movement and an angle of tilt in prescribed period ΔT are calculated from an output from detector 80 and the initial value.

In step 4, stereoscopic vision is judged based on the distance of movement and the angle of tilt which have been calculated. Specifically, stereoscopic vision is judged based on whether the distance of movement and the angle of tilt which have been calculated are greater than respective preset threshold values. For example, if the calculated distance of movement is smaller than the preset distance-of-movement threshold value, then it is judged that stereoscopic vision is possible. If the calculated angle of tilt is smaller than the preset angle-of-tilt threshold value, then it is judged that stereoscopic vision is possible. If it is judged that stereoscopic vision is possible, then stereographic display is performed in step 5, from which control goes to step 7.

If it is judged that stereoscopic vision is not possible, then stereographic display switches to planar display in step 6. The planar display according to the first exemplary embodiment refers to a process of turning off the function of the image swapping means (e.g., to not display a parallax barrier pattern), sending image data with no parallax as shown in FIG. 9(b) to display panel 11, and projecting a parallax-free image onto the observer. After stereographic display switches to planar display, control goes back to step 3 in which a distance of movement and an angle of tilt in prescribed period ΔT are calculated.

In step 7, it is determined whether the initial value for use as a reference in calculating movement of casing 10 is to be updated or not. If "No" is judged in step 7, then control goes back to step 3. If "Yes" is judged in step 7, control goes back to step 2 in which an output from detector 80 at this time is recorded in place of the initial value recorded in step 1.

The above steps are repeated.

In the above operation flow, prescribed period ΔT should preferably be set to a value between about the frame cycle of display panel 11 and about 0.2 second. As can be seen from the flowchart shown in FIG. 20, if ΔT is long, then switching from the stereoscopic display to the planar display is delayed with respect to movement of casing 10. As a result, the stereoscopic display switches to the planar display after the observer sees a pseudo-stereoscopic image and a dual image.

Therefore, it is better to have shorter ΔT. However, even if switching between the stereoscopic display and the planar display is to be made a plurality of times within one frame cycle of display panel 11, there is not enough time to switch image data for the entire display screen. In other words, ΔT that is shorter than the frame cycle is not effective enough for switching following with respect to movement of casing 10.

Step 7 serves as a function to deal with a change in the position and tilt of the casing which happens when the observer changes its attitude or changes the way in which the observer holds the display device. Therefore, the judging process in step S7 does not need to be carried out for each pass. The number of passes may be counted, and when an appropriate count is reached, the observer may be prompted to enter a judgement using an operation switch or the like on the display device, or when a prescribed count is reached, an automatic decision "Yes" may be made. However, if an acceleration sensor is used to detect a distance of movement, then it is preferable to update the initial value because it acts to clear an accumulated error.

As described above with reference to FIGS. 13(a), 13(b) through 16(a), 16(b), the conditions for judging stereoscopic vision in step 4 are the conditions for limiting stereoscopic vision which are derived from right-eye area 70R and left-eye area 70L that are determined at the time the display device is designed and from the optimum positions of both eyes of the observer that are also determined at the time the display device is designed. The conditions for judging stereoscopic vision which are derived from the above designing conditions may have a function, which is applied to initial settings, to allow the observer to move and tilt casing 10 to look for limitations on stereoscopic vision and store conditions for limiting stereoscopic vision, while performing stereoscopic vision in step 1 (a function to record a distance of movement and an amount of tilt or the output of a relevant sensor at the time stereoscopic vision is limited). In this case, though the observer is burdened, the inter-eye distance of the observer and the observational distance which is preferred by the observer, rather than the inter-eye distance and the observational distance which are representative of design parameters of the display device, are reflected, making it possible to switch between stereoscopic display and planar display in a manner to match the individual observer. Furthermore, if the conditions for judging stereoscopic vision further have a function to save the recorded conditions for limiting stereoscopic vision when the display device is switched off, then it is not necessary to perform a process of recording the conditions for limiting stereoscopic vision each time the observer uses the display device.

(Second Exemplary Embodiment)

A second exemplary embodiment is of the same structure as the first exemplary embodiment described above, and uses the same method of determining whether or not both eyes of the observer are in the stereoscopic viewing area as the first exemplary embodiment. However, the second exemplary embodiment is different from the first exemplary embodiment as to its operation after both eyes of the observer are judged as being positioned outside of the stereoscopic viewing area and stereoscopic display switches to a planar display until stereoscopic display is performed again. Specifically, after stereoscopic display switches to planar display, stereoscopic display will be resumed when the position and tilt of casing 10 returns values near the recorded initial values. The values near the initial values for resuming stereoscopic display (hereinafter referred to as 2D→3D return values) should preferably be selected by the observer based on its preference from a choice of large/medium/small values disposed on the display screen (for example, "large value" may be ±10% of the initial values, "medium values" may be ±5% of the initial values, and "small values" may be ±2% of the initial values). Therefore, the second exemplary embodiment is different as to the operation from the first exemplary embodiment because of the added function to set the 2D→3D return values.

Figure 21:
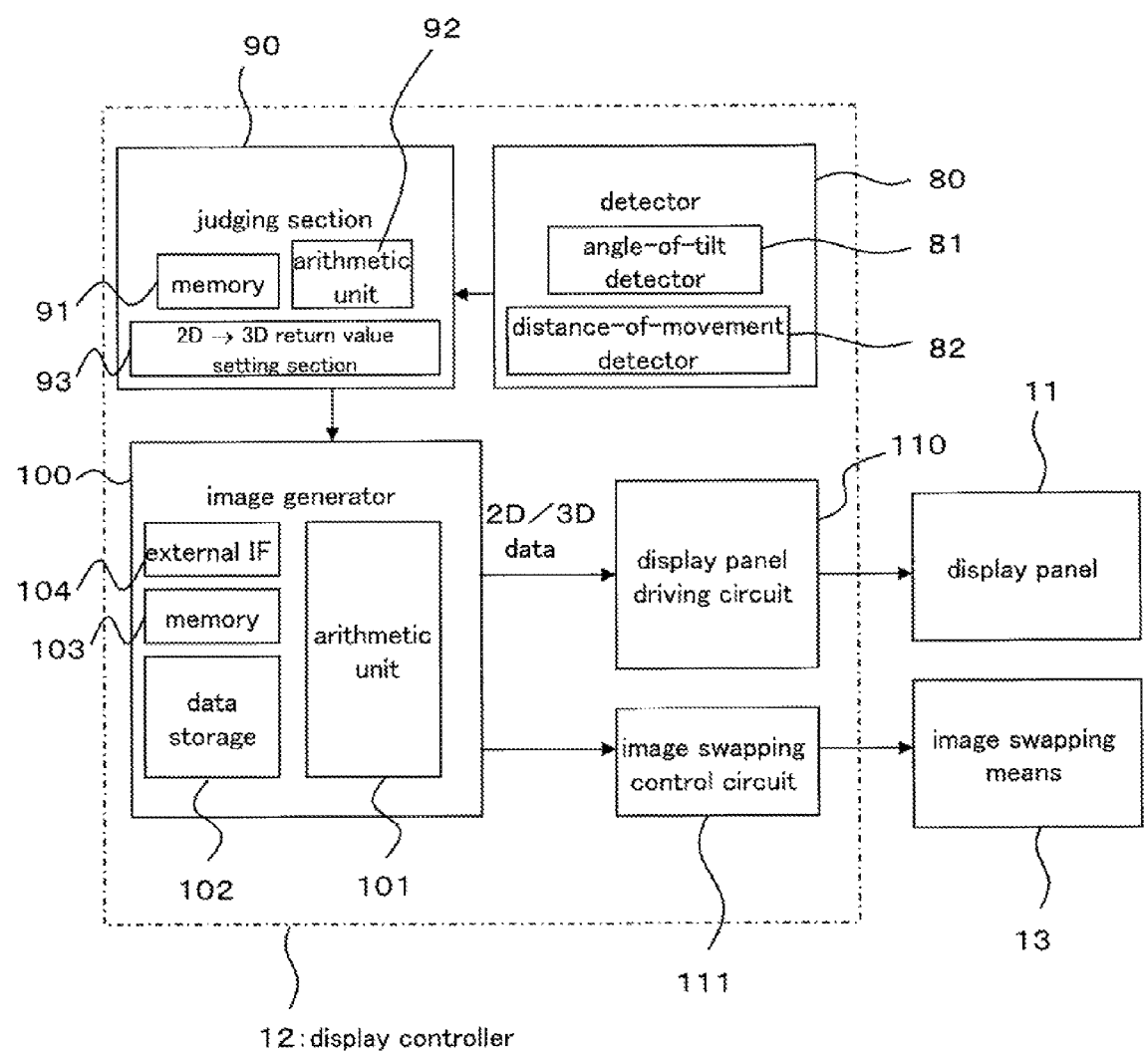
FIG. 21 is a functional block diagram of the second exemplary embodiment of the present invention.

FIG. 21 is a functional block diagram of the second exemplary embodiment of the present invention. As with the first exemplary embodiment, the second exemplary embodiment comprises display panel 11, image swapping means 13, and display controller 12. Display controller 12 comprises image generator 100, detector 80, judging section 90, display panel driving circuit 110, and image swapping control circuit 111. As shown in FIG. 21, the second exemplary embodiment is the same as the first exemplary embodiment except that 2D→3D return value setting section 93 is added to judging section 90. The process of determining whether or not both eyes of the observer are in the stereoscopic viewing area is also the same as the first exemplary embodiment.

With respect to the 2D→3D return values, judging areas for the return values which are formed by reducing right-eye area 70R and left-eye area 70L shown in FIG. 10 around the right-eye and left-eye positions of an optimum observer may be calculated and used for judgment.

Figure 22:
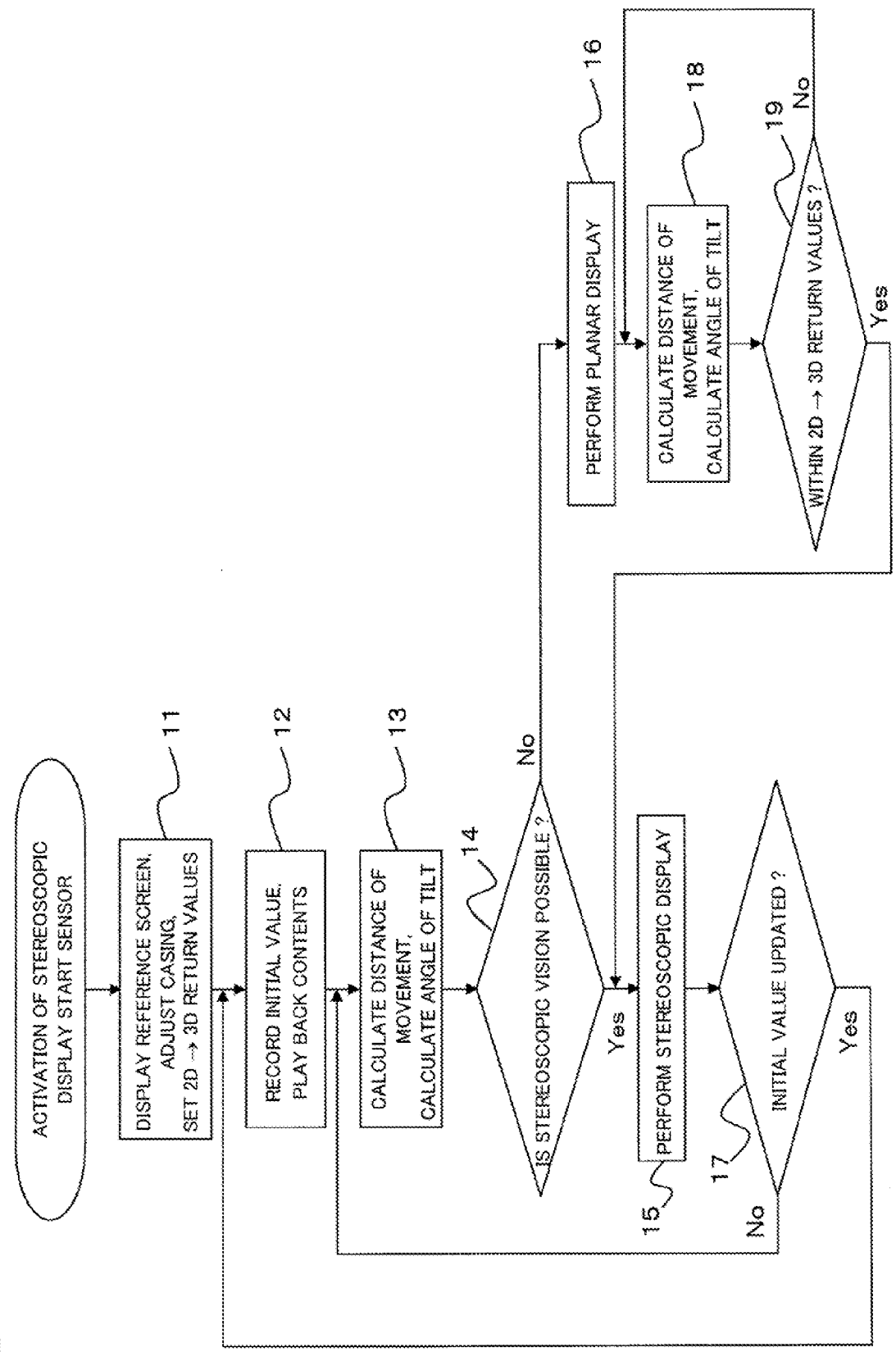
FIG. 22 is a flowchart of an operation sequence of second, third, fifth, and seventh exemplary embodiments of the present invention.

Operation of the second exemplary embodiment will be described below with reference to a flowchart shown in FIG. 22.

At the same time that the stereoscopic display is started, the sensor for detecting movement of casing 10 is activated.

Then, a reference screen for guiding the observer to the optimum observational position is displayed. The stereoscopic display according to the second exemplary embodiment refers to a process of turning on the function of the image swapping means (e.g., to display a parallax barrier pattern), sending image data with a parallax as shown in FIG. 9(a) to the display panel, and projecting images respectively onto the left and right eyes of the observer, as with the first exemplary embodiment.

In step 11, the observer adjusts the position and tilt of casing 10 so that the displayed reference screen can be seen as a stereoscopic image. The observer also generates 2D→3D return values for switching from planar display to stereoscopic display with 2D→3D return value setting section 93.

Then, in step 12, with the position and tilt of casing 10 being adjusted by the observer, an output from detector 80 is recorded as an initial value, and the desired content are played back for stereoscopic display.

In step 13, a distance of movement and an angle of tilt in prescribed period ΔT are calculated from an output from detector 80 and the initial value.

In step 14, stereoscopic vision is judged based on the distance of movement and the angle of tilt which have been calculated. Specifically, stereoscopic vision is judged based on whether the distance of movement and the angle of tilt which have been calculated are greater than respective preset threshold values. For example, if the calculated distance of movement is smaller than the preset distance-of-movement threshold value, then it is judged that stereoscopic vision is possible. If the calculated angle of tilt is smaller than the preset angle-of-tilt threshold value, then it is judged that stereoscopic vision is possible. If it is judged that stereoscopic vision is possible, then stereographic display is performed in step 15, from which control goes to step 17.

If it is judged that stereoscopic vision is not possible, then stereographic display switches to planar display in step 16. The planar display according to the second exemplary embodiment refers to a process of turning off the function of the image swapping means (e.g., to not display a parallax barrier pattern), sending image data with no parallax as shown in FIG. 9(b) to the display panel, and projecting a parallax-free image onto the observer, as with the first exemplary embodiment.

After stereographic display switches to planar display, control goes to step 18 in which a distance of movement and an angle of tilt in prescribed period ΔT are calculated. Then, in step 19, it is determined whether the distance of movement and the angle of tilt which are calculated fall within the 2D→3D return values that have been set. If the distance of movement and the angle of tilt fall within the 2D→3D return values, then planar display switches to stereographic display in step 15. If the distance of movement and the angle of tilt do not fall within the 2D→3D return values, then planar display remains unchanged and control goes back to step 18. In other words, unless the distance of movement and the angle of tilt fall within the 2D→3D return values, step 18 and step 19 are repeated and planar display does not switch back to stereographic display.

If the output from detector 80 falls back within the 2D→3D return values, then planar display switches to stereographic display and thereafter control goes to step 17.

In step 17, it is determined whether the initial value for use as a reference in calculating movement of casing 10 is to be updated or not. If "No" is judged in step 7, then control goes back to step 13. If "Yes" is judged in step 17, control goes back to step 12 in which an output from detector 80 at this time is recorded in place of the initial value recorded in step 11.

The above steps are repeated.

In the above operation flow described with reference to FIG. 22, prescribed period ΔT should preferably be set to a value between, about the frame cycle of display panel 11 and about 0.2 second, as described above in the operation of the first exemplary embodiment. Furthermore, the judging process in step S17 does not need to be carried out for each pass, as described above in the operation of the first exemplary embodiment. The number of passes may be counted, and when an appropriate count is reached, the observer may be prompted to enter a judgement using an operation switch or the like on the display device, or when a prescribed count is reached, an automatic decision "Yes" may be made. Moreover, the conditions for judging stereoscopic vision in step 14 may have a function to allow the observer to determine and store conditions for limiting stereoscopic vision, as described above in the operation of the first exemplary embodiment.

As described above, the second exemplary embodiment has complex processing and additional functions compared with the first exemplary embodiment. However, since the observer sets points to return to stereoscopic display on its own, the second exemplary embodiment is effective for reducing a feeling of strangeness at the time that planar display switches back to stereoscopic display and also for reducing an uncomfortable feeling caused when frequent switching occurs between the stereoscopic display and planar display.

(Third Exemplary Embodiment)

A third exemplary embodiment resides in using an ordinary optical device (a parallax barrier, a lenticular lens, or the like) as the image swapping means, rather than the electrooptical device that can be turned on and off by electric signals (e.g., a transmissive liquid crystal panel for displaying a parallax barrier pattern) used in the first and second exemplary embodiments. The other configurations than the image swapping means are the same as those of the first exemplary embodiment.

Figure 23:
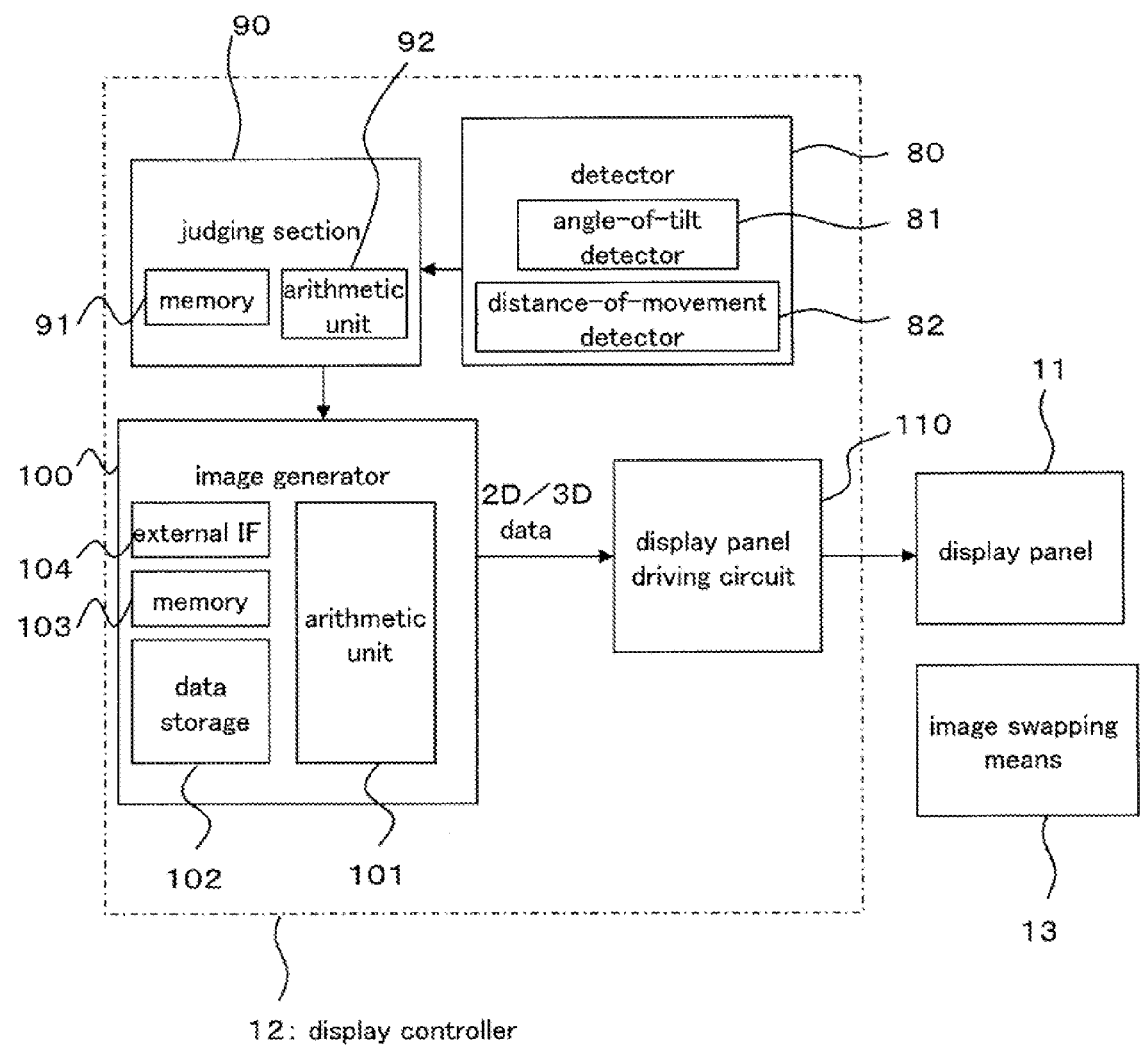
FIG. 23 is a functional block diagram of the third and fourth exemplary embodiments of the present invention.

FIG. 23 is a functional block diagram of the third exemplary embodiment.

As with the first exemplary embodiment, the third exemplary embodiment comprises display panel 11, image swapping means 13, and display controller 12. Display controller 12 is similar to the display controller (see FIG. 8) according to the first exemplary embodiment except that it dispenses with image swapping control circuit 111.

As shown in FIG. 23, display controller 12 according to the third exemplary embodiment comprises image generator 100, detector 80, judging section 90, and display panel driving circuit 110. The roles of these components are the same as those of the first exemplary embodiment, and will not be described below.

Figure 24A:
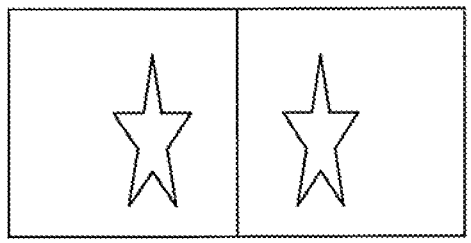
FIG. 24(a) is a diagram showing image data generated by an image generator according to the third exemplary embodiment of the present invention.
Figure 24B:
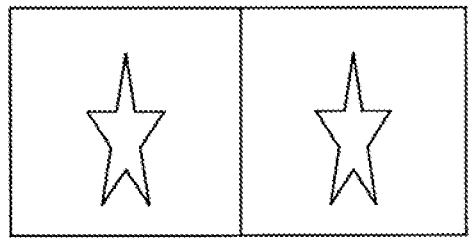
FIG. 24(b) is a diagram showing image data generated by the image generator according to the third exemplary embodiment of the present invention.

However, 2D data used for the planar display which are generated by image generator 100 are different from those in the first exemplary embodiment. According to the third exemplary embodiment, the image swapping function cannot be turned off. For the planar display as well as the stereoscopic display, therefore, the unit pixels of the display panel are alternately used as right-eye pixels and left-eye pixels. Therefore, the horizontal resolution of two-dimensional image data to be generated for planar display is also one half of the display panel. Image data should preferably be generated by performing a rendering process on three-dimensional data including depth information. 3D data used for stereoscopic display are generated by setting two hypothetical viewpoints corresponding to both eyes of the observer and performing a rendering process. 2D data for the planar display are generated by setting one viewpoint corresponding to the center between both eyes of the observer and performing a rendering process. Specifically, 3D data as image data to be generated are shown in FIG. 24(*a*), and 2D data as image data to be generated are shown in FIG. 24(*b*).

As with the first exemplary embodiment, image data should preferably be generated from three-dimensional data including depth information. However, data to be displayed which have been subjected to a rendering process, as shown in FIGS. 24(*a*) and 24(*b*) may be stored in data storage 102 in advance and then may be selectively read from data storage 102. According to this process, as no rendering process is required, arithmetic unit 101 may have a lower processing capability and a lower calculating rate than if a rendering process is required. Therefore, image generator 100 may be of an inexpensive configuration.

Since the third exemplary embodiment has many features in common with the first exemplary embodiment, only the differences will be described below with reference to the flowchart shown in FIG. 20 which shows the operation sequence according to the first exemplary embodiment.

According to the third exemplary embodiment, the image swapping means is not controlled at the time of switching to planar display in step 6. For the planar display according to the third exemplary embodiment, a right-eye image shown in FIG. 24(*a*) is sent to the left- and right-eye pixels, or a left-eye image is sent to the left- and right-eye pixels, or image date shown in FIG. 24(*b*) are sent to project an image free of a parallax onto the observer. In other words, the image data sent to the left- and right-eye pixels are identical to each other.

For planar display in step 16, using the coordinate system described with reference to FIGS. 10, 13(*a*), 13(*b*) through 16(*a*), 16(*b*), left-eye data may be sent to the left- and right-eye pixels when casing 10 is judged as being moved in the negative direction along the X-axis or tilted to the left, and left-eye data may be sent to the left- and right-eye pixels when casing 10 is judged as being moved in the positive direction along the X-axis or tilted to the right.

By switching between the data as described above, it is possible to reduce a feeling of strangeness at the time that a stereoscopic display switches to a planar display. According to our research, however, depending on the observer, when a stereoscopic display switches to a planar display, there are cases in which it feels natural to the observer to switch to right-eye data or to left-eye data irrespective of the direction in which casing 10 is moved or tilted. In those cases, the data with which the observer feels natural are display data matching the dominant eye of the observer. Consequently, for the planar display in step 6, it is preferable to provide a function which allows the observer, on his own, to set data to be sent to the left and right eye pixels.

The second exemplary embodiment is also applicable to the arrangement of the third exemplary embodiment.

Figure 25:
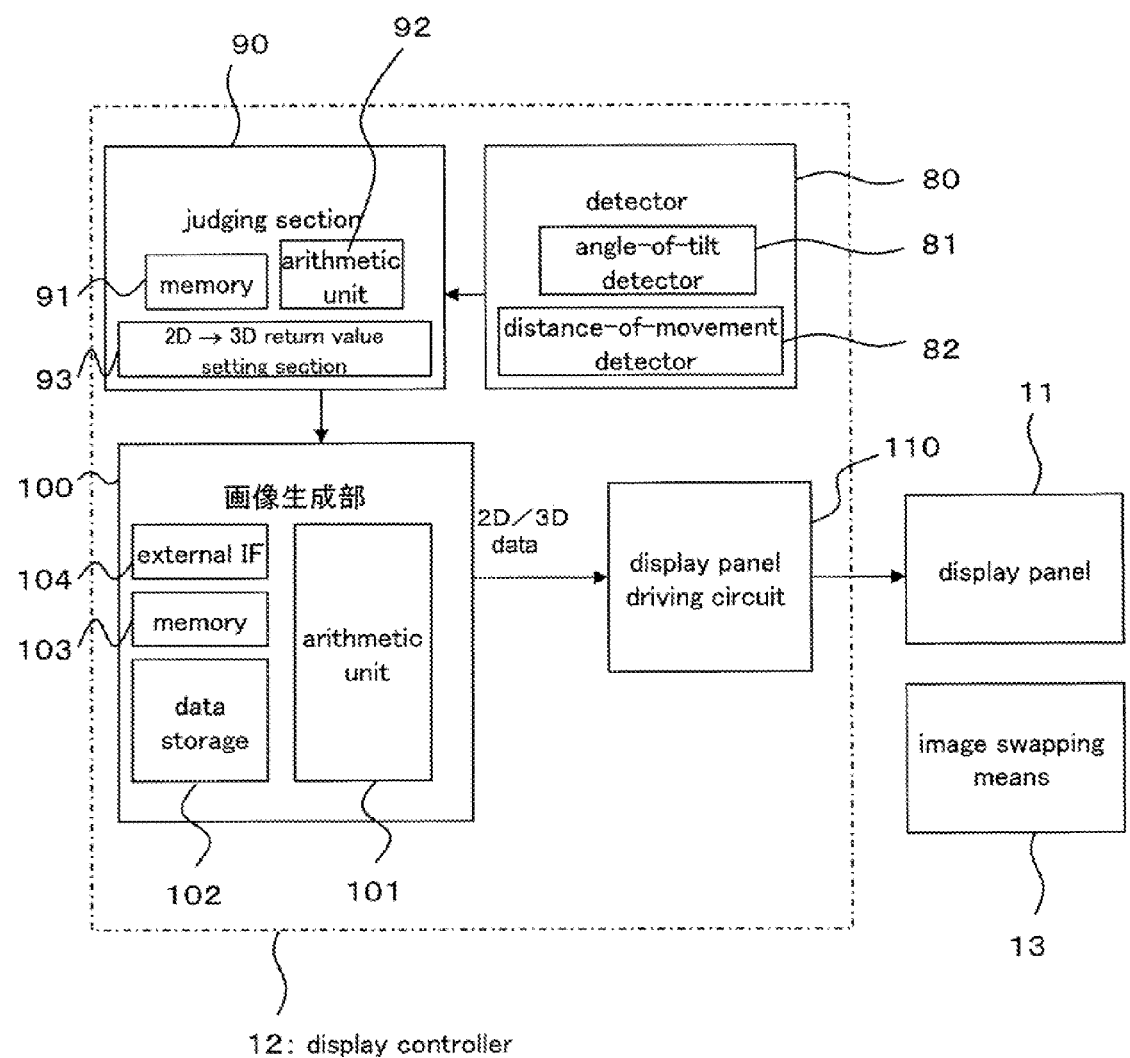
FIG. 25 is a functional block diagram of the third and fourth exemplary embodiments of the present invention.

FIG. 25 is a functional block diagram for such a case, wherein 2D→3D return value setting section 93 is added to judging section 90. As described above, the arrangement according to the third exemplary embodiment is different from the second exemplary embodiment in that it dispenses with image swapping control circuit 111 and image generator 100 generates different image data. The operation of the third exemplary embodiment, to which the flowchart shown in FIG. 22 is applicable, is the same as the operation of the second exemplary embodiment except that the image swapping means does not control switching to a planar display (step 16) and the image data applied to the planar display. As described above, a function may be provided which allows the image data applied to planar display to be selected depending on the direction in which casing 10 is moved or tilted or to be selected so as to match the dominant eye of the observer.

The differences between the first and second exemplary embodiments and the third exemplary embodiment have been described above. The third exemplary embodiment does not use an electrooptical device unlike the first and second exemplary embodiments. Therefore, though the horizontal resolution for planar display is lower, the manufacturing cost of the display device can be reduced, the casing thereof can be made slightly smaller, and the reliability of the display device is higher according to the third exemplary embodiment.

(Fourth Exemplary Embodiment)

An arrangement according to a fourth exemplary embodiment resides in using a display panel which is capable of projecting different images to the left and right eyes of the observer from a portion corresponding to a pixel which is a minimum display unit that produces an image on a standard planar display panel. The display panel may be, for example, a time-division stereoscopic display panel disclosed in Patent document 1. For example, the display panel may be a display panel having twice more pixels in the horizontal direction along which both eyes of the observer are aligned, than the standard flat display panel.

Figure 26A:
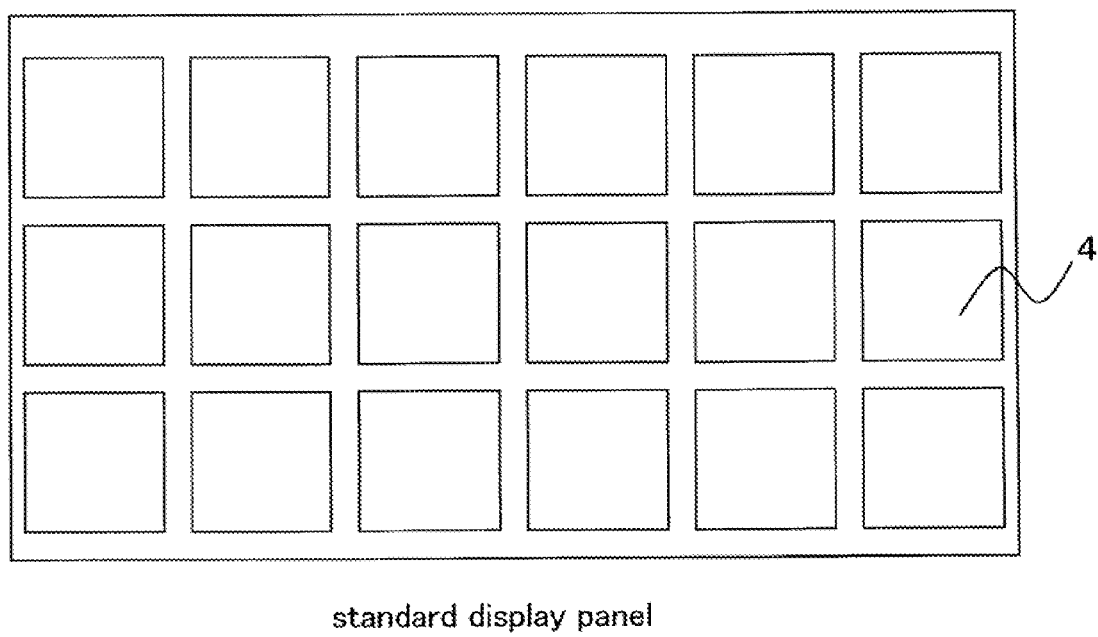
FIG. 26(a) is a diagram illustrative of a pixel structure of a display panel used in the fourth exemplary embodiment of the present invention.

An example of a display device according to the fourth exemplary embodiment is illustrated in the front elevational view shown in FIG. 6 which has been referred to with respect to the first exemplary embodiment. As shown in FIG. 7 is a cross-sectional view of casing 10 taken along line b of FIG. 6, the display device according to the fourth exemplary embodiment includes display panel 11, image swapping means 13, display controller 12, and operation switch 14 which are housed in casing 10. Display panel 11 comprises a transmissive liquid crystal panel which includes a plurality of unit pixels, and as the following features compared with the standard flat display panel:

FIG. 26(a) is a diagram illustrative of a pixel structure of a standard flat display panel. The standard flat display panel comprises a matrix of pixels 4 including six pixels in each horizontal row and three pixels in each vertical row. Pixels 4 are capable of expressing any desired gradations, and can express images of 6×3 pixels depending on input data. While each of pixels 4 is of a square shape, the illustrated shape is for illustrative purposes only, and each of pixels 4 may be of any shape insofar as the ratio of vertical and horizontal dimensions remains the same when images are expressed of 6×3 pixels.

Figure 26B:
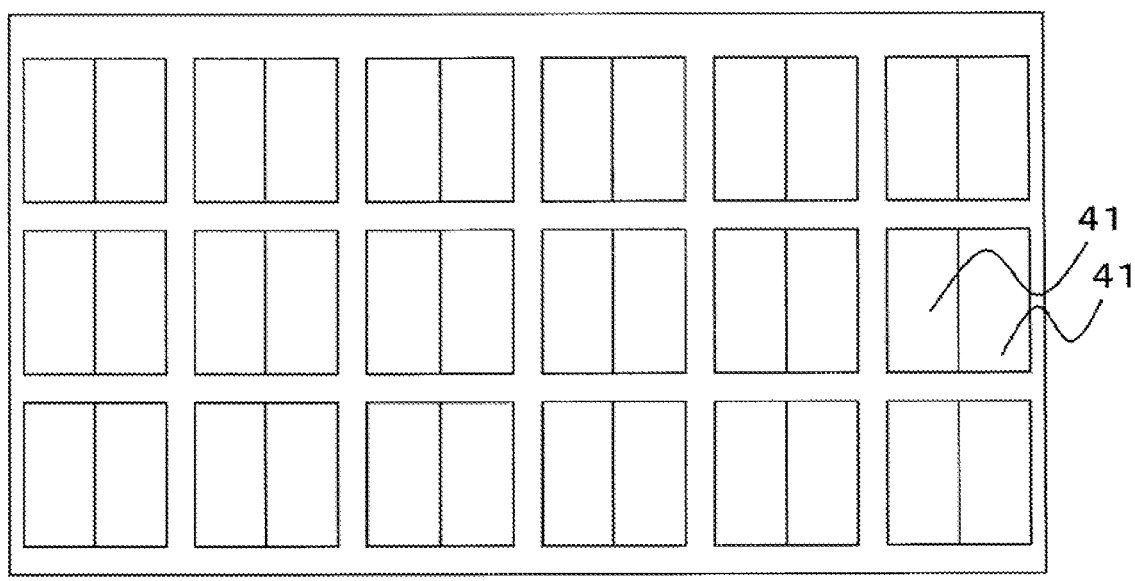
FIG. 26(b) is a diagram illustrative of a pixel structure of a display panel used in the fourth exemplary embodiment of the present invention.
Figure 27:
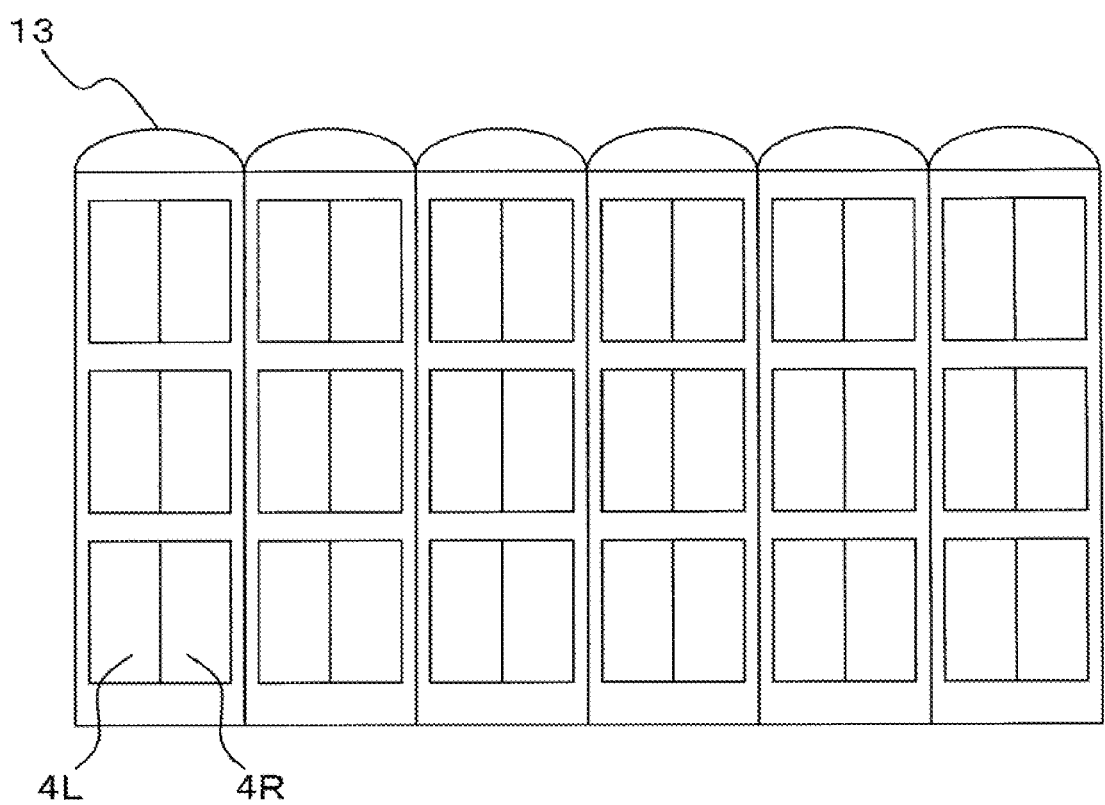
FIG. 27 is a diagram showing the positional relationship between the display panel and a lenticular lens used in the fourth exemplary embodiment of the present invention.

FIG. 26(b) is a diagram illustrative of the pixel structure of the display panel according to the fourth exemplary embodiment, in comparison with FIG. 26(a). The display panel according to the fourth exemplary embodiment comprises a matrix of pixels 41, each made up of two sections divided by a vertical line from one of pixels 4 of the standard flat display panel, including twelve pixels in each horizontal row and three pixels in each vertical row. Pixels 41 are capable of expressing any desired gradations, and can express images of 12×3 pixels. Since each of pixels 41 has a horizontal dimension which is one-half of its vertical dimension, the size of the display screen is the same as the size of the display screen of the standard flat display panel shown in FIG. 26(a). While each of pixels 41 is of a rectangular shape, the illustrated shape is for illustrative purposes only, and each of pixels 41 may be of any shape insofar as the ratio of vertical and horizontal dimensions thereof is 2:1. Image swapping means 13 comprises a lenticular lens that is arranged as shown in FIG. 27 to cause pixels 41 to function horizontally alternately as left-eye pixels 4L and right-eye pixels 4R for stereoscopic display.

The fourth exemplary embodiment may be illustrated in a functional block diagram which is the same as FIG. 23 which shows the third exemplary embodiment.

The fourth exemplary embodiment is different from the third exemplary embodiment as to image data generated by image generator 100. As with the previous exemplary embodiment, data to be displayed which are stored in data storage 102 comprise three-dimensional data including depth information, and it is preferable to generate two-dimensional image data by arithmetic unit 101 which performs a rendering process on the three-dimensional data. 3D data used for stereoscopic display, i.e., two-dimensional image data for the left and right eyes having a parallax, are generated by setting two hypothetical viewpoints corresponding to the left and right eyes of the observer and performing a rendering process.

2D data for planar display, i.e., image data free of a parallax, are generated by setting one viewpoint corresponding to the center between the left and right eyes of the observer and performing a rendering process. Since the display panel according to the fourth exemplary embodiment has a resolution which is twice greater in the horizontal direction, 2D data for planar display may comprise right-eye data produced by a rendering process for a stereoscopic display as data for the left and right eye, or may comprise left-eye data produced by a rendering process for a stereoscopic display as data for the left and right eye. 3D data as image data to be generated and 2D data as image data to be generated are shown in FIGS. 28(a) through 28(d).

Figure 28A:
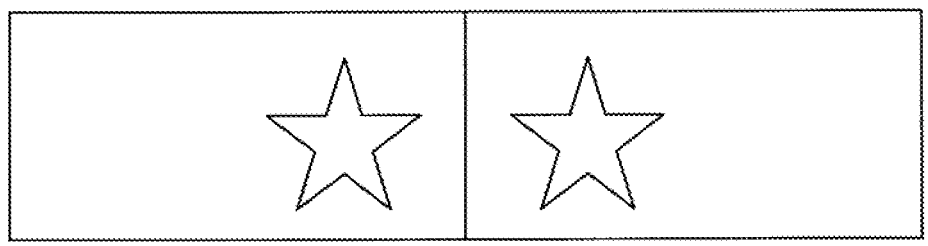
FIG. 28(a) is a diagram showing image data generated by an image generator according to the fourth and fifth exemplary embodiments of the present invention.
Figure 28B:
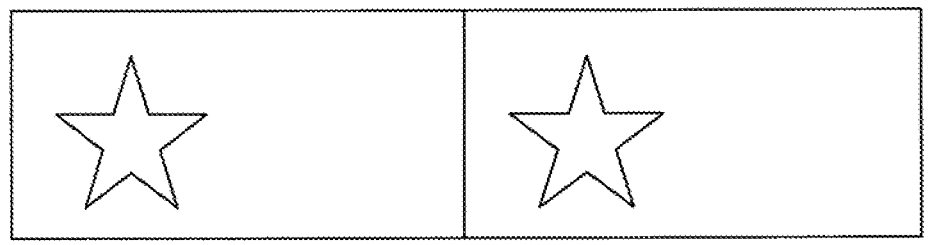
FIG. 28(b) is a diagram showing image data generated by the image generator according to the fourth and fifth exemplary embodiments of the present invention.
Figure 28C:
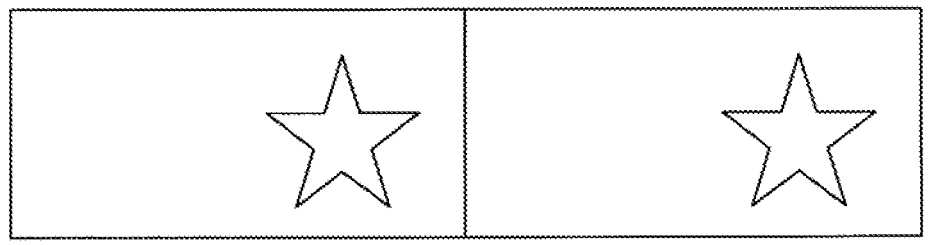
FIG. 28(c) is a diagram showing image data generated by the image generator according to the fourth and fifth exemplary embodiments of the present invention.
Figure 28D:
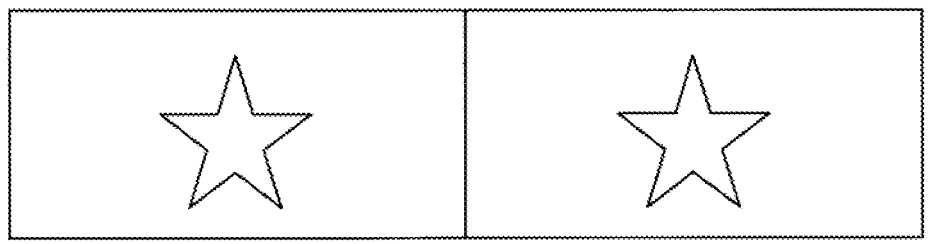
FIG. 28(d) is a diagram showing image data generated by the image generator according to the fourth and fifth exemplary embodiments of the present invention.

In the fourth exemplary embodiment, data to be displayed which have been subjected to a rendering process may be stored in data storage 102 in advance in the format of two-dimensional data corresponding to FIG. 28(a) which are free of depth information. The format is widely used for actual content captured using two cameras. Two-dimensional data corresponding to FIGS. 28(a) and 28(d) may also be stored in data storage 102. Since these data do not need to be subjected to a rendering process, as described above, arithmetic unit 101 and memory 103 may be inexpensive.

In FIG. 27, image swapping means 13 comprises a lenticular lens. However, image swapping means 13 may comprise a parallax barrier. Though the parallax barrier is less bright than the lenticular lens, it allows the display device to be manufactured less costly.

The process of determining whether or not both eyes of the observer are positioned in the stereoscopic viewing area has been described with respect to the first exemplary embodiment.

Figure 20:
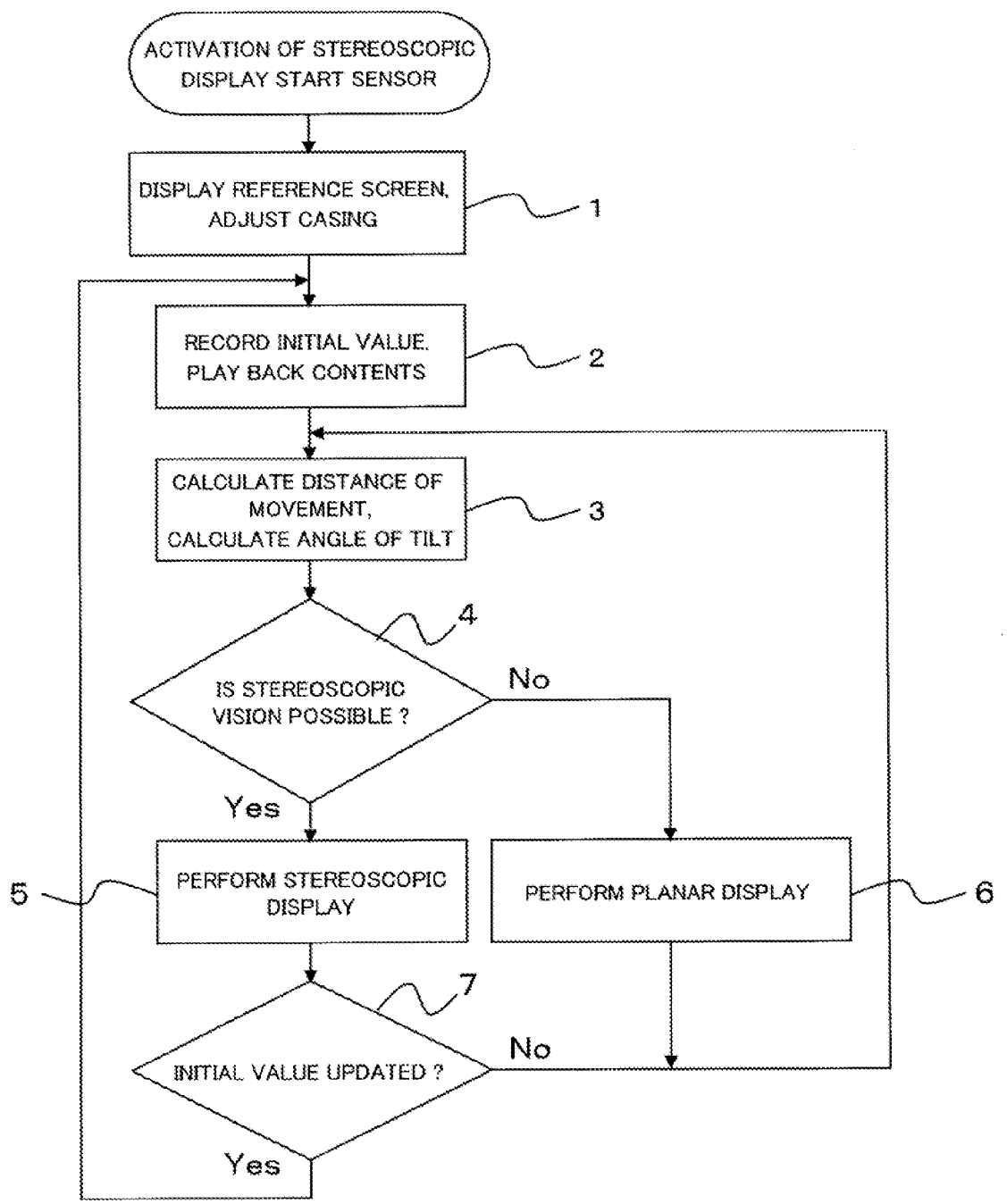
FIG. 20 is a flowchart of an operation sequence of first, third, fourth, and sixth exemplary embodiments of the present invention.

The operation of the fourth exemplary embodiment is the same as the operation of the third exemplary embodiment except for the data for planar display which are used in step 6 of the flowchart shown in FIG. 20.

In the fourth exemplary embodiment, as is the case with the third exemplary embodiment, planar display is achieved by sending identical image data to right-eye pixels 4R and left-eye pixels 4L. However, the image data have a different horizontal resolution from the image data used in the third exemplary embodiment, and may be either image data shown in FIGS. 28(a) through 28(d).

As with the third exemplary embodiment, a function may be provided which allows the image data applied to planar display to be selected depending on the direction in which casing 10 is moved or tilted or to be selected so as to match the dominant eye of the observer.

[Advantages]

The stereoscopic display device according to the fourth exemplary embodiment has the same resolution for planar display and stereoscopic display since it uses display panel 11 schematically shown in FIG. 26(b). When switching to planar display in a flow from step 4 to step 6 shown in FIG. 20, the observer does not experience a feeling of strangeness whereas in the first and second exemplary embodiments the observer has a feeling of strangeness due to a change in the horizontal resolution.

In the present exemplary embodiment, the stereoscopic pixel unit which includes a single unit pixel comprises a left-eye pixel and a right-eye pixel that are horizontally arrayed as the unit pixel. However, the present invention is not limited to such a configuration.

According to another example, while obtaining the same advantages as described above, the present invention can be applied to a process of projecting parallax images onto the left and right eyes of the observer based on light rays emitted in a time-division fashion from unit pixels, with optical distributing means by way of backlight control.

(Fifth Exemplary Embodiment)

A fifth exemplary embodiment is based on the operation of the second exemplary embodiment which is applied to the arrangement of the fourth exemplary embodiment described above.

The fifth exemplary embodiment is represented by the functional block diagram shown in FIG. 27. The fifth exemplary embodiment is different from the fourth exemplary embodiment in that judging section 90 includes 2D→3D return value setting section 93 described above with respect to the second exemplary embodiment, and will not be described in detail below.

Operation of the fifth exemplary embodiment is essentially the same as the operation of the second exemplary embodiment. With reference to the flowchart shown in FIG. 22, the fifth exemplary embodiment is different from the second exemplary embodiment as to the image swapping means which is not turned on and off and the image data used in step 16. In the fifth exemplary embodiment, image data applied to planar display may be any items of image data either image data shown in FIGS. 28(a) through 28(d) as described above with respect to the fourth embodiment. In addition, a function may be provided which allows the image data applied to planar display to be selected depending on the direction in which casing 10 is moved or tilted or to be selected so as to match the dominant eye of the observer.

[Advantages]

Inasmuch as the stereoscopic display device according to the fifth exemplary embodiment has the same resolution for a planar display and stereoscopic display, eliminating the strange feeling that is caused by a change in resolution and also reducing the uncomfortable feeling that is caused when frequent switching occurs between the stereoscopic display and the planar display is effective.

(Sixth Exemplary Embodiment)

A sixth exemplary embodiment resides in using a display panel having at least three viewpoint pixels arranged in a horizontal direction. Though a unit pixel may be used as each of the viewpoint pixels, the present exemplary embodiment uses a display panel which includes at least three viewpoint pixels arranged in a horizontal direction in a portion corresponding to a pixel which is a minimum display unit that produces an image on a standard planar display panel. Specifically, the present exemplary embodiment uses a display panel which includes N pixels, where N represents the number of viewpoints, in a portion corresponding to a pixel which is a minimum display unit that produces an image on a standard planar display panel.

The sixth exemplary embodiment where N=4 will be described below.

As shown in FIG. 6, the display device according to the sixth exemplary embodiment includes display panel 11, image swapping means 13, display controller 12, and operation switch 14 which are housed in casing 10. As described above, display panel 11 has four pixels in a portion corresponding to a pixel which is a minimum display unit that produces an image on a standard planar display panel.

Figure 29:
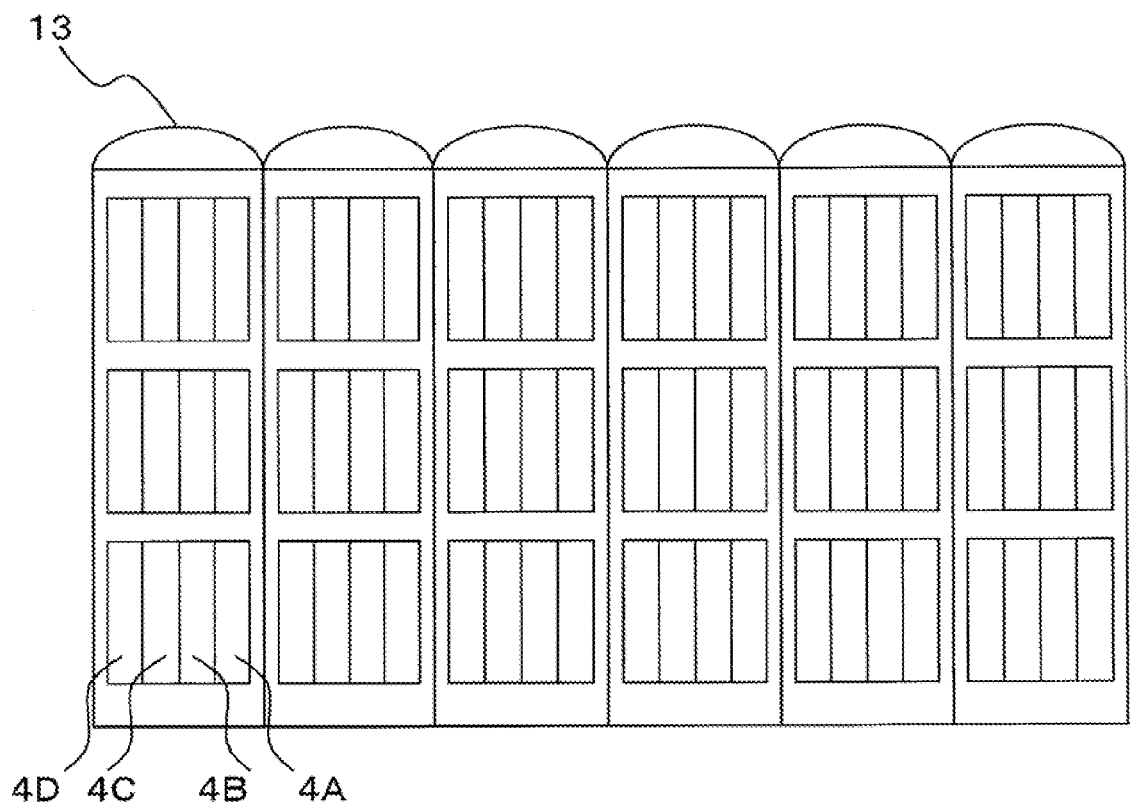
FIG. 29 is a diagram illustrative of a pixel structure of a display panel used in the sixth exemplary embodiment of the present invention.

FIG. 29 is a diagram illustrative of a pixel structure of the display panel used in the sixth exemplary embodiment. The display panel according to the sixth exemplary embodiment includes a matrix of pixels, each made up of four sections divided by vertical lines from one of pixels 4 of the standard flat display panel shown in FIG. 26(a), including twenty-four pixels in each horizontal row and three pixels in each vertical row. The pixels shown in FIG. 29 are capable of expressing any desired gradations (e.g., on a liquid crystal panel), and can express images of 24×3 pixels. Since the ratio of a horizontal dimension to a vertical dimension is ¼, the size of the display screen is the same as the standard flat display panel which is made up of 6×3 pixels shown in FIG. 26(a). While each of the pixels is of a rectangular shape, the illustrated shape is for illustrative purposes only, and each of the pixels may be of any shape insofar as the ratio of vertical and horizontal pixel numbers is 4:1. While the display panel is made of 24×3 pixels, the illustrated size is for illustrative purposes only, and the total number of pixels may be determined depending on the purpose of the display panel. For a stereoscopic display, the pixels function as first viewpoint pixel 4D, second viewpoint pixel 4C, third viewpoint pixel 4B, and fourth viewpoint pixel 4A which are arranged in a horizontal direction. A lenticular lens as image swapping means 13 is disposed as shown in FIG. 29.

The stereoscopic display on the display panel according to the sixth exemplary embodiment will be described below.

Figure 30:
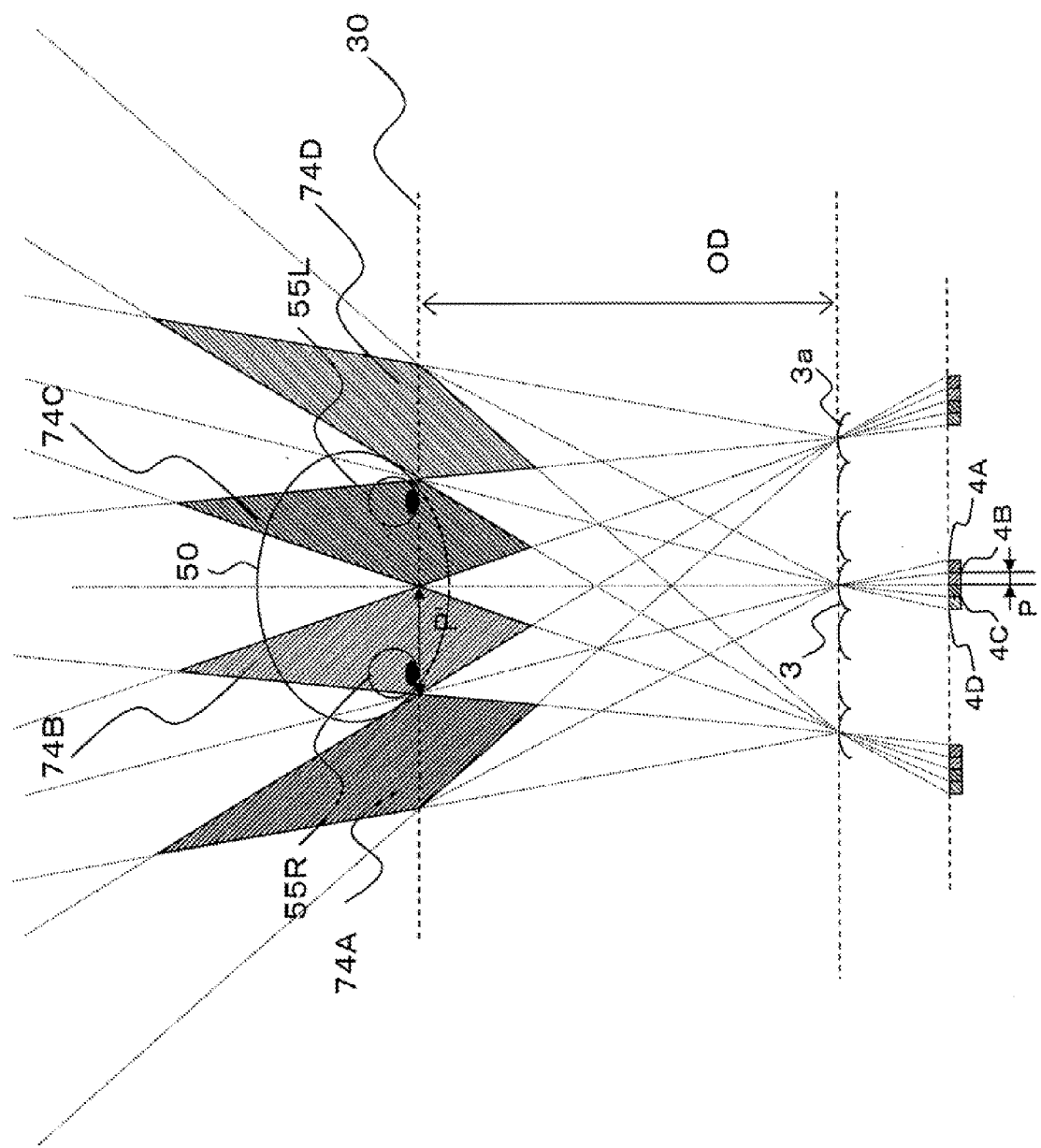
FIG. 30 is a diagram showing an optical model in which images are projected onto a plane which is spaced an optimum observation distance according to the sixth exemplary embodiment of the present invention.

FIG. 30 is a cross-sectional view of an optical model in which images are projected onto observational plane 30 which lies parallel to the surface of the display panel and is spaced an optimum observation distance OD therefrom.

The display panel (not shown) comprises a group of a group of light modulating elements as a matrix of pixels (e.g., a liquid crystal panel). FIG. 30 shows only an array of first viewpoint pixel 4D, second viewpoint pixel 4C, third viewpoint pixel 4B, and fourth viewpoint pixel 4A.

Lenticular lens 3 which functions as the image swapping means is disposed on the front surface (facing observational plane 30) of the display panel. A light source (not shown: so-called backlight) is disposed on a rear surface (remote from lenticular lens 3) of the display panel. Lenticular lens 3 comprises a linear array of cylindrical lenses 3a each in the form of a one-dimensional lens having a hog-backed convex shape. Lenticular lens 3 does not have a lens effect in its longitudinal direction, but has a lens effect only in its array direction which is perpendicular to the longitudinal direction. Lenticular lens 3 is arranged such that its longitudinal direction is perpendicular to the direction along which first viewpoint pixel 4D, second viewpoint pixel 4C, third viewpoint pixel 4B, and fourth viewpoint pixel 4A are arranged. One cylindrical lens 3a is assigned to each set of pixels 4D, 4C, 4B, 4A.

Light emitted from each pixel is deflected by lenticular lens 3 and projected. Of the light emitted from each pixel, light that passes through the principal point (vertex) of closest cylindrical lens 3a is illustrated as a light ray. Then, there are defined area 74D where images are projected from all first viewpoint pixels 4D, area 74C where images are projected from all second viewpoint pixels 4C, area 74B where images are projected from all third viewpoint pixels 4B, and area 74A where images are projected from all fourth viewpoint pixels 4A. The pitch of each pixel is represented by P, and the width of a projected image on observational plane 30 which is spaced from the pixels by optimum observation distance OD is represented by P'.

FIG. 30 is a diagram showing an optical model in which right eye 55R of observer 50 is positioned in area 74B and left eye 55L of observer 50 is positioned in area 74C.

Figure 31:
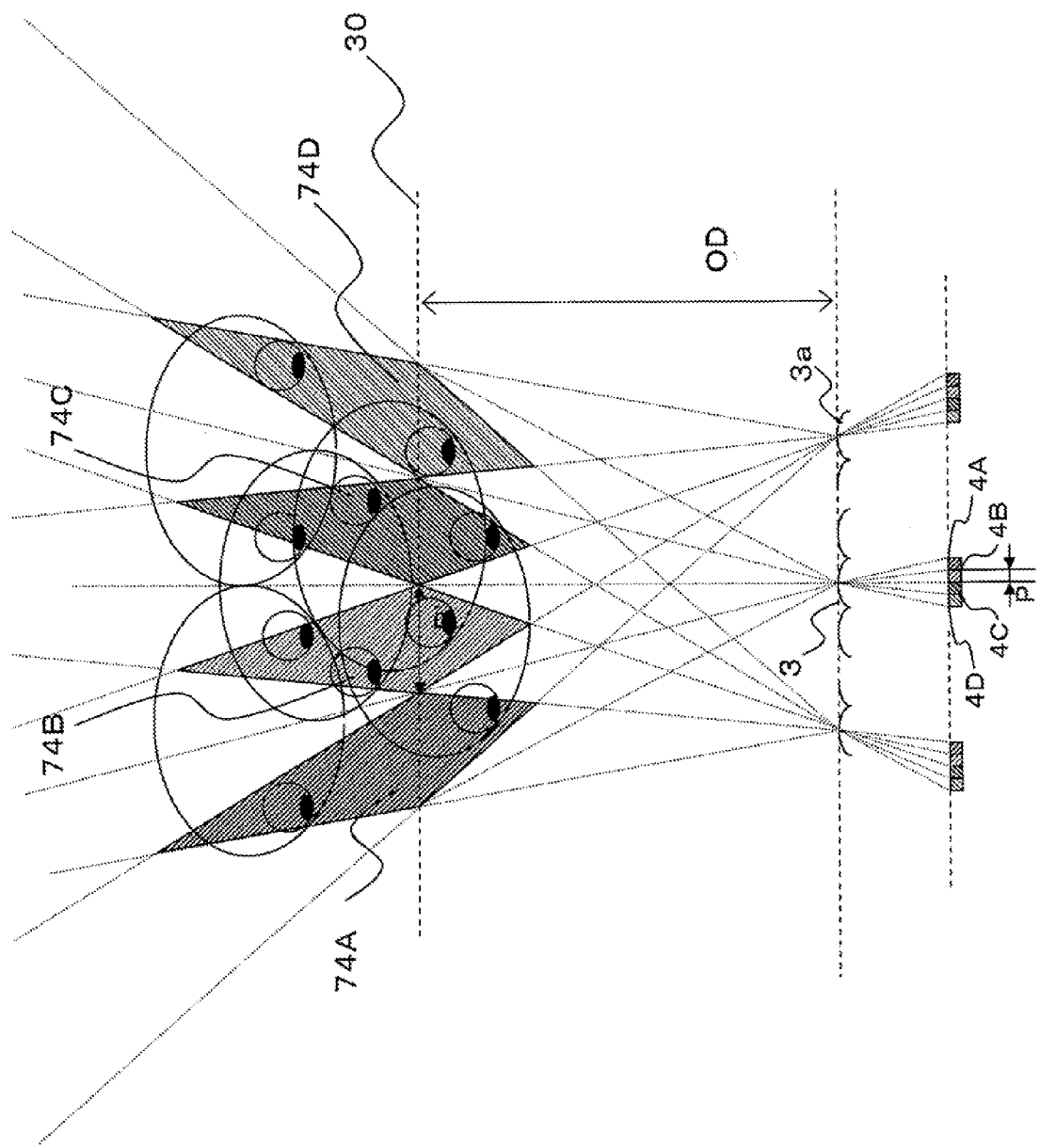
FIG. 31 is a diagram showing an optical model in which the right eye of the observer is positioned in area 74B and the left eye in area 74C according to the sixth exemplary embodiment of the present invention.

If there is a parallax between image data sent to second viewpoint pixels 4C and third viewpoint pixels 4B, then the observer recognizes the displayed image as a stereoscopic image. The right eye of the observer may be positioned in area 74A and the left eye of the observer may be positioned in area 74B. According to the sixth exemplary embodiment, the observer can enjoy various combinations of parallax images between area 74A and area 74B, as shown in FIG. 31. If an image to be displayed which is projected between area 74A and area 74B is an image rendered from four viewpoints, then the observer can enjoy a stereoscopic image from different angles and at the same time can be given a motion parallax by changing its observational position, resulting in an increased stereoscopic effect.

The sixth exemplary embodiment is represented by the same functional block diagram as the fourth exemplary embodiment, which is shown in FIG. 23. Though the sixth exemplary embodiment is represented by the same functional block diagram, image generator 100 generates different data because the sixth exemplary embodiment uses a different display panel.

As with the previous exemplary embodiment, data to be displayed which are stored in data storage 102 comprise three-dimensional data including depth information, and it is preferable to generate two-dimensional image data by arithmetic unit 101 which performs a rendering process on the three-dimensional data. 3D data used for stereoscopic display, i.e., four two-dimensional image data having a parallax, are generated by setting four hypothetical viewpoints and performing a rendering process.

2D data for planar display, i.e., image data free of a parallax, are generated by setting one viewpoint corresponding to the center between the left and right eyes of the observer and performing a rendering process. Since the display panel according to the sixth exemplary embodiment has a resolution which is four times greater in the horizontal direction, 2D data for planar display may comprise one of the data images from among the data (four images) produced by a rendering process for stereoscopic display.

Figure 32A:
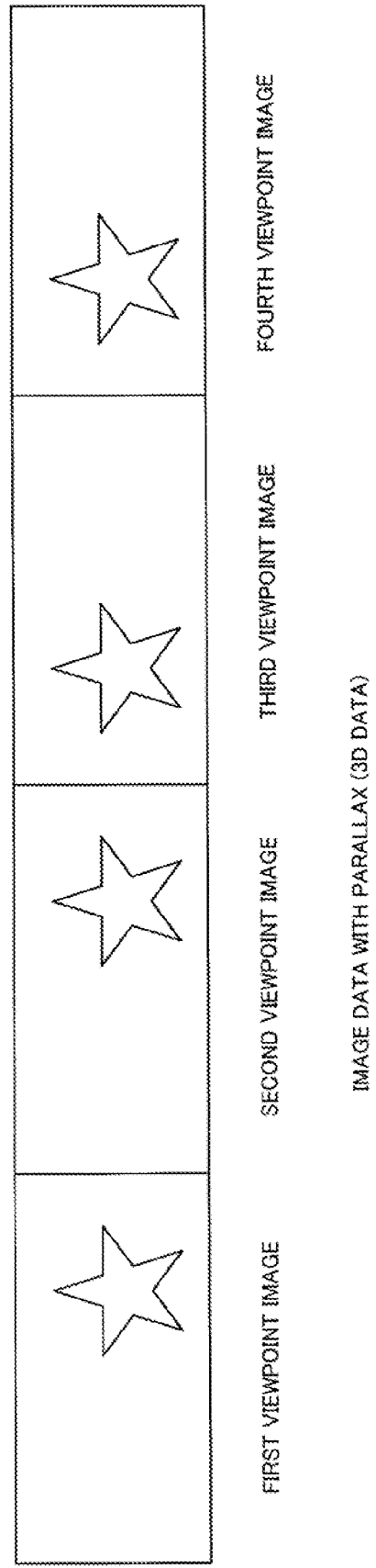
FIG. 32(a) is a diagram showing image data generated by an image generator according to the sixth and seventh exemplary embodiments of the present invention.

3D data as image data to be generated and 2D data as image data to be generated are shown in FIGS. 32(a) and 32(b).

Data to be displayed which have been subjected to a rendering process may be stored in the data storage in advance in the format of two-dimensional data corresponding to FIG. 32(a) which are free of depth information. For example, the format is capable of handling actual content captured using four cameras. Two-dimensional data corresponding to FIGS. 32(a) and 32(b) may also be stored in the data storage. Since these data do not need to be subjected to a rendering process, the arithmetic unit and the memory may be inexpensive.

As described above, image generator 100 generates 2D/3D data depending on the signal from judging section 90, and outputs the generated 2D/3D data to display panel driving circuit 110.

In the arrangement according to the sixth exemplary embodiment, image swapping means 13 comprises a lenticular lens. However, image swapping means 13 may comprise a parallax barrier. Although the parallax barrier is not as bright as the lenticular lens, it enables a reduction in the manufacturing cost of the display device.

Figure 33:
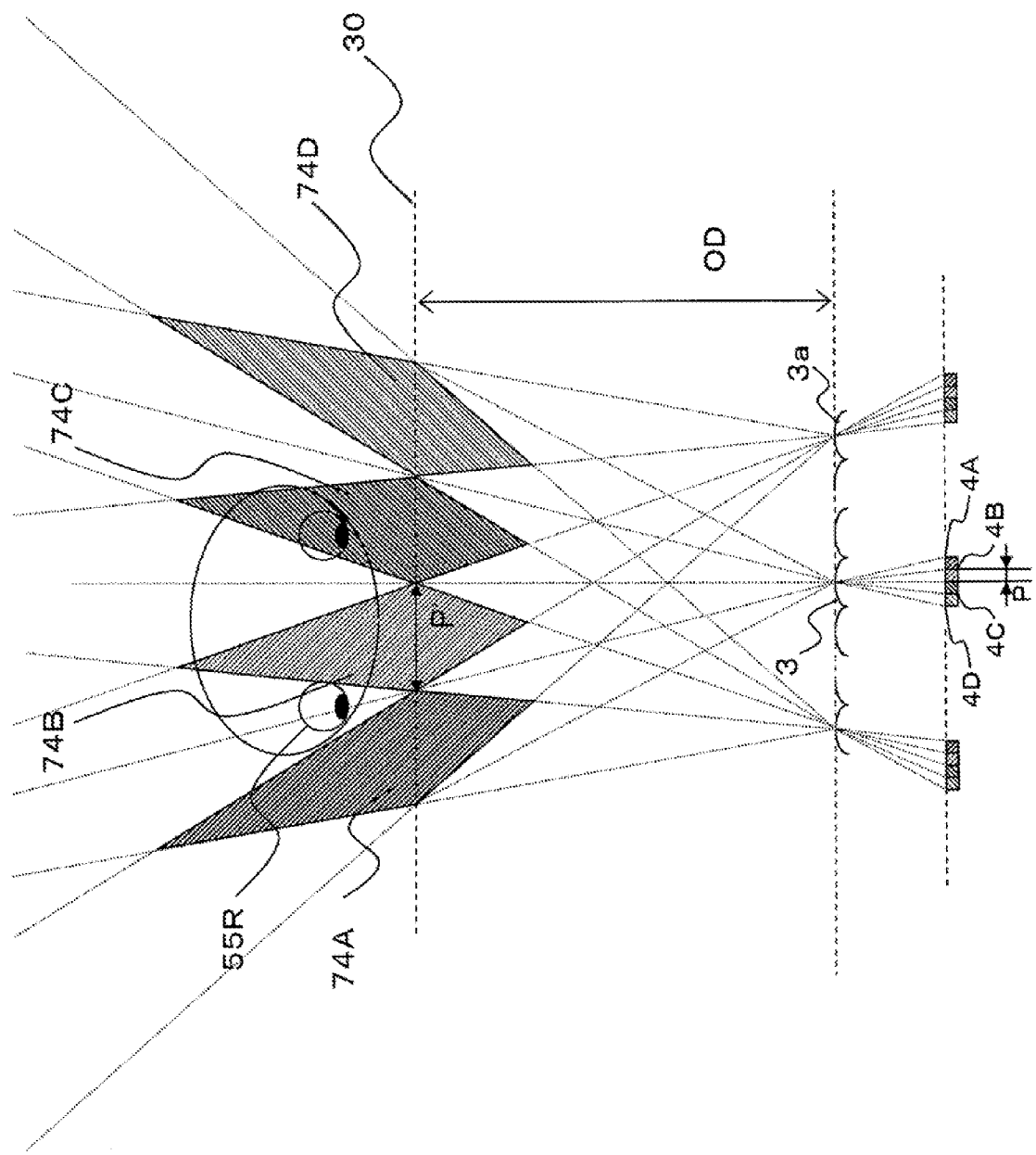
FIG. 33 is a diagram showing an optical model in which the observer observes parallax images in various combinations according to the sixth exemplary embodiment of the present invention.

In the sixth exemplary embodiment, the conditions for determining whether or not both eyes of the observer are positioned in the stereoscopic viewing area may be based on boundary line information of diamond-shaped areas 74A through 74D shown in FIG. 30. Furthermore, combination of areas 74A through 74D shown in FIG. 31 are allowed. In addition, if there is little parallax between images projected onto area 74A and area 74B, that causes a dual image to be less noticeable, then the positions where both images can be seen as shown in FIG. 33 are also allowed. According to the present exemplary embodiment, therefore, the conditions for stereoscopic vision should preferably determined to match the preference of the observer.

[Description of the Operation]

Operation of the sixth exemplary embodiment can be described with reference to the flowchart shown in FIG. 20 as with the operation of the third and fourth exemplary embodiments. The operation of the sixth exemplary embodiment is different from the operation of the third and fourth exemplary embodiments only in that data for planar display in step 6 are different. The planar display according to the sixth exemplary embodiment is achieved by equalizing all the image data sent to the first through fourth viewpoint pixels. The image data are illustrated as either the image data items shown in FIG. 32(a) or the image data shown in FIG. 32(b).

As described above in the other exemplary embodiments, stereoscopic vision may be judged in step 4 shown in FIG. 20 by applying the conditions for judging stereoscopic vision which are derived from the designing conditions to the initial settings, allowing the observer to move and tilt casing 10 to look for limitations on stereoscopic vision, and storing conditions for limiting stereoscopic vision, while performing stereoscopic vision in step 1. As described above with respect to the conditions for judging stereoscopic vision, this process is particularly effective in the sixth exemplary embodiment.

In step S6 for planar display, the first viewpoint data may be sent to the four types of pixels when casing 10 is moved in the negative direction along the X-axis or tilted to the left at the time planar display is judged, and the fourth viewpoint data may be sent to the four types of pixels when casing 10 is moved in the positive direction along the X-axis or tilted to the right at the time planar display is judged. The feeling of strangeness that occurs in an observer when switching from a stereoscopic display to a planar display can be reduced by switching between the data, as described above.

According to our research, however, depending on the observer, when stereoscopic display switches to planar display, there are cases when switching to the first and second viewpoint data or the third and fourth viewpoint data, irrespective of the direction in which casing 10 is moved or tilted; feels natural to the observer. In those cases, display data that match the dominant eye of the observer are data that feels natural to the observer. Consequently, for planar display in step 6, it is preferable to provide a function which allows the observer, on his own, to set data to be sent to the four types of pixels.

The sixth exemplary embodiment has been described above as being applied to a display panel having pixels of four viewpoints. However, the number of viewpoints may be represented by N, and image generator 100 may generate image data of N viewpoints.

(Seventh Exemplary Embodiment)

A seventh exemplary embodiment is based on the operation of the second exemplary embodiment which is applied to the arrangement of the sixth exemplary embodiment described above, and is different therefrom with regard to the operation after having switched to planar display until stereoscopic display is performed again.

The arrangement according to the seventh exemplary embodiment is the same as the sixth embodiment except that judging section 90 includes 2D→3D return value setting section 93, and will not be described in detail below. As with the sixth exemplary embodiment, the display panel according to the seventh exemplary embodiment has pixels of four viewpoints. However, the number of viewpoints may be represented by N, and image data of N viewpoints may be generated.

Operation of the seventh exemplary embodiment can be described with reference to the flowchart shown in FIG. 22 as with the operation of the third and fifth exemplary embodiments. As with the sixth exemplary embodiment, the image data for planar display in step 16 are illustrated as either the image data shown in FIG. 32(*a*) or the image data shown in FIG. 32(*b*).

As described above with respect to the sixth exemplary embodiment, a function may be provided which allows the image data applied to planar display in step 16 to be selected depending on the direction in which casing 10 is moved or tilted or to be selected so as to match the dominant eye of the observer.

With the stereoscopic display device according to the seventh exemplary embodiment, as with the sixth exemplary embodiment, the observer can enjoy a stereoscopic image from different angles and at the same time can be given a motion parallax, resulting in an increased stereoscopic effect.

The present invention is applicable to portable information terminals (terminal devices) such as mobile phones, portable personal computers, portable game machines, portable media player, etc.

As described above, the stereoscopic display device according to the present invention detects movement of the casing thereof and projects a parallel-free image in a situation wherein a stereoscopic display is not appropriate, thereby preventing the observer from feeling discomfort and also preventing the observer from suffering symptoms such as vertigo and motion sickness. Since the stereoscopic viewing area is judged by detecting movement of the casing and performing calculations, the display device is less expensive than conventional line-of-vision-tracking display devices which require a camera, an image processing function for detecting viewpoint positions, and an infrared irradiator.

While the present invention has been described above with respect to the exemplary embodiments, the present invention is not limited to the above exemplary embodiments. Various changes that can be understood by those skilled in the art can be made to the configuration and details of the present invention within the scope of the present invention.

This application is the National Phase of PCT/JP2009/067469, filed Oct. 7, 2009, which is based upon and claims the benefit of priority from Japanese Patent Application No. 2008-300965 filed on Nov. 26, 2008, the entire disclosure of which is incorporated herein by reference.

The invention claimed is:

1. A display device for displaying an image in either a stereoscopic display or a planar display, comprising:
   a detector that detects movement of the display device;
   a judging section that compares a value representative of the movement of the display device which is detected by said detector with a preset threshold value;
   an image generator that generates and outputs, from among at least two image data items, either 3D data or 2D data, based on a result of the comparison made by said judging section;
   a display panel that displays the image data output by said image generator, said display panel comprising a plurality of unit pixels; and
   image swapping means that controls the projection of the image data displayed by said display panel from said display panel;
   wherein said detector detects an angle of tilt of the display device as the movement of the display device;
   said judging section compares the angle of tilt detected by said detector with a preset angle-of-tilt threshold value;
   said image generator generates the 3D data for performing stereoscopic display if the angle of tilt is smaller than said angle-of-tilt threshold value as indicated by the result of the comparison made by said judging section, and generates the 2D data for performing planar display otherwise;
   said angle-of-tilt threshold value is the threshold value that has been determined as the conditions for limiting stereoscopic vision which are derived from the optimum positions of both eyes of the observer at the time the display device is designed; and
   said display device is a handheld device.

2. The display device according to claim 1, wherein said detector comprises an acceleration sensor, a geomagnetic sensor, a gyrosensor, or an angular velocity sensor.

3. The display device according to claim 1, wherein said detector detects a distance of movement of the display device as the movement of the display device;
   said judging section compares the distance of movement detected by said detector with a preset distance-of-movement threshold value;
   said image generator generates the image data having the parallax if the angle of tilt is smaller than said angle-of-tilt threshold value and the distance of movement is smaller than said distance-of-movement threshold value as indicated by the result of the comparison made by said judging section, and generates the image data free of the parallax otherwise; and
   said distance-of-movement threshold value is the threshold value that has been determined as the conditions for limiting stereoscopic vision which are derived from the optimum positions of both eyes of the observer at the time the display device is designed.

4. The display device according to claim 3, wherein said detector comprises an acceleration sensor, an ultrasonic sensor, or a small-size camera.

5. A display device for displaying an image in either a stereoscopic display or a planar display, comprising:
   a detector that detects movement of the display device;
   a judging section that compares a value representative of the movement of the display device which is detected by said detector with a preset threshold value;
   an image generator that generates and outputs, from among at least two image data items, either 3D data or 2D data, based on a result of the comparison made by said judging section;
   a display panel that displays the image data output by said image generator, said display panel comprising a plurality of unit pixels; and
   image swapping means for controlling the projection of the image data displayed by said display panel from said display panel;
   wherein said image generator generates the 3D data for performing stereoscopic display if the value representative of the movement of the display device is smaller than the threshold value as indicated by the result of the comparison made by said judging section, generates the 2D data for performing planar display otherwise, and selects and outputs an arbitrary viewpoint image depending on the direction of the movement of the display device which is detected by said detector;
   said threshold value is the threshold value that has been determined as the conditions for limiting stereoscopic vision which are derived from the optimum positions of both eyes of the observer at the time the display device is designed; and
   said display device is a handheld device.

6. The display device according to claim 1, wherein said stereoscopic display and said planar display have the same resolution.

7. The display device according to claim 1, wherein at least two viewpoint images are displayed in said stereoscopic display.

8. The display device according to claim 1, wherein said image swapping means comprises an electrooptical device.

9. The display device according to claim 8, wherein said image swapping means is turned on if the value representative of the movement is smaller than the threshold value as indicated by the result of the comparison made by said judging section, and is turned off otherwise.

10. The display device according to claim 1, wherein said image generator generates the image data having the parallax irrespective of a judged result from said judging section; and
said display panel displays said at least two image data having the parallax using said unit pixels if the judging section judges that the value representative of the movement is smaller than the threshold value, and displays one of the image data having the parallax using said unit pixels otherwise.

11. The display device according to claim 1, wherein said display panel includes a stereoscopic pixel unit comprising at least two of the unit pixels each comprising a right-eye pixel and a left-eye pixel, and displays said image data using said stereoscopic pixel unit.

12. The display device according to claim 1, wherein said display panel includes a stereoscopic pixel unit comprising one of the unit pixels each comprising a right-eye pixel and a left-eye pixel which are arrayed in a horizontal direction, and displays said image data using said stereoscopic pixel unit.

13. The display device according to claim 1, wherein said display panel includes a stereoscopic pixel unit comprising a horizontal array of viewpoint pixels each comprising at least three of the unit pixels, and displays said image data using said stereoscopic pixel unit.

14. The display device according to claim 1, wherein said display panel includes a stereoscopic pixel unit comprising a horizontal array of at least three viewpoint pixels in one of the unit pixels, and displays said image data using said stereoscopic pixel unit which comprises one of the unit pixels.

15. The display device according to claim 1, wherein said image generator develops an amount of parallax depending on depth information, with respect to data to be displayed which has said depth information.

16. The display device according to claim 1, wherein said image generator generates said at least two image data having the parallax as two left- and right-eye image data to be displayed and generates said image data free of the parallax as central image data to be displayed between said two left- and right-eye image data.

17. The display device according to claim 1, wherein said image generator generates said image data free of the parallax by selecting and outputting an arbitrary viewpoint image depending on the dominant eye of the observer which is set from outside of the display device.

18. A terminal device including a display device according to claim 1.

19. A display method for displaying an image on a display device, comprising:
a process of detecting movement of the display device;
a process of comparing a value representative of the detected movement of the display device with a preset threshold value;
a process of generating, from among at least two image data items, either 3D data or 2D data, based on a result of the comparison; and
a process of displaying the generated image data;
wherein said process of detecting detects an angle of tilt of the display device;
said process of comparing compares the detected angle of tilt with a preset angle-of-tilt threshold value;
said process of generating generates the 3D data for performing stereoscopic display if the angle of tilt is smaller than the angle-of-tilt threshold value as a result of the comparison, and generates the 2D data for performing planar display otherwise;
said angle-of-tilt threshold value is the threshold value that has been determined as the conditions for limiting stereoscopic vision which are derived from the optimum positions of both eyes of the observer at the time the display device is designed; and
said display device is a handheld device.

20. The display method according to claim 19, wherein said process of detecting further detects a distance of movement of the display device;
said process of comparing further compares the detected distance of movement with a preset distance-of-movement threshold value;
said process of generating generates the image data having the parallax if the angle of tilt is smaller than the angle-of-tilt threshold value and the distance of movement is smaller than the preset distance-of-movement threshold value, and generates the image data free of the parallax otherwise; and
said distance-of-movement threshold value is the threshold value that has been determined as the conditions for limiting stereoscopic vision which are derived from the optimum positions of both eyes of the observer at the time the display device is designed.

21. The display device according to claim 5, wherein said stereoscopic display and said planar display have the same resolution.

22. The display device according to claim 5, wherein at least two viewpoint images are displayed in said stereoscopic display.

23. The display device according to claim 5, wherein said image swapping means comprises an electrooptical device.

24. The display device according to claim 23, wherein said image swapping means is turned on if the value representative of the movement is smaller than the threshold value as indicated by the result of the comparison made by said judging section, and is turned off otherwise.

25. The display device according to claim 5, wherein said image generator generates the image data having the parallax irrespective of a judged result from said judging section; and
said display panel displays said at least two image data having the parallax using said unit pixels if the judging section judges that the value representative of the movement is smaller than the threshold value, and displays one of the image data having the parallax using said unit pixels otherwise.

26. The display device according to claim 5, wherein said display panel includes a stereoscopic pixel unit comprising at least two of the unit pixels each comprising a right-eye pixel and a left-eye pixel, and displays said image data using said stereoscopic pixel unit.

27. The display device according to claim 5, wherein said display panel includes a stereoscopic pixel unit comprising one of the unit pixels each comprising a right-eye pixel and a left-eye pixel which are arrayed in a horizontal direction, and displays said image data using said stereoscopic pixel unit.

28. The display device according to claim 5, wherein said display panel includes a stereoscopic pixel unit comprising a horizontal array of viewpoint pixels each comprising at least three of the unit pixels, and displays said image data using said stereoscopic pixel unit.

29. The display device according to claim 5, wherein said display panel includes a stereoscopic pixel unit comprising a horizontal array of at least three viewpoint pixels in one of the unit pixels, and displays said image data using said stereoscopic pixel unit which comprises one of the unit pixels.

30. The display device according to claim 5, wherein said image generator develops an amount of parallax depending on depth information, with respect to data to be displayed which has said depth information.

31. The display device according to claim 5, wherein said image generator generates said at least two image data having the parallax as two left- and right-eye image data to be displayed and generates said image data free of the parallax as central image data to be displayed between said two left- and right-eye image data.

32. The display device according to claim 5, wherein said image generator generates said image data free of the parallax by selecting and outputting an arbitrary viewpoint image depending on the dominant eye of the observer which is set from outside of the display device.

33. A terminal device including a display device according to claim 5.

* * * * *